United States Patent
Janjua et al.

(10) Patent No.: US 12,525,302 B2
(45) Date of Patent: Jan. 13, 2026

(54) MEMORY DEVICE INCLUDING CHARGE PUMP, AND OPERATION METHOD OF THE MEMORY DEVICE

(71) Applicant: Samsung Electronics Co., Ltd., Suwon-si (KR)

(72) Inventors: Bilal Ahmad Janjua, Suwon-si (KR); Jihyun Park, Suwon-si (KR); Chiweon Yoon, Suwon-si (KR); Jungyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 18/602,709

(22) Filed: Mar. 12, 2024

(65) Prior Publication Data
US 2024/0312531 A1 Sep. 19, 2024

(30) Foreign Application Priority Data
Mar. 13, 2023 (KR) .................. 10-2023-0032824

(51) Int. Cl.
G11C 16/10 (2006.01)
G11C 16/04 (2006.01)
G11C 16/30 (2006.01)

(52) U.S. Cl.
CPC .......... *G11C 16/30* (2013.01); *G11C 16/0483* (2013.01); *G11C 16/10* (2013.01)

(58) Field of Classification Search
CPC ...................................................... G11C 7/14
See application file for complete search history.

(56) References Cited

U.S. PATENT DOCUMENTS

| | | | |
|---|---|---|---|
| 6,107,862 A | 8/2000 | Mukainakano et al. | |
| 6,337,563 B2 | 1/2002 | Takimoto et al. | |
| 7,009,445 B2 | 3/2006 | Ishii | |
| 7,081,742 B2 | 7/2006 | Ito et al. | |
| 7,973,592 B2 | 7/2011 | Pan | |
| 10,985,650 B2 | 4/2021 | Zhang et al. | |
| 11,443,778 B1 | 9/2022 | Kalluru et al. | |
| 2019/0171381 A1* | 6/2019 | Ioannou ............... | G06F 3/0679 |

* cited by examiner

*Primary Examiner* — Jason Lappas
(74) *Attorney, Agent, or Firm* — Fish & Richardson P.C.

(57) ABSTRACT

A memory device includes a memory cell array including a plurality of memory cells, a control logic configured to control a memory operation with respect to the plurality of memory cells, and a voltage generator configured to output a voltage for the memory operation. The voltage generator includes a charge pump configured to generate the voltage, and a peak control circuit configured to sense a current flowing from a pad, to which an external voltage is applied, to the charge pump, and control a peak of the current to be a threshold level or less based on a result of the sensing.

20 Claims, 19 Drawing Sheets

MEMORY DEVICE INCLUDING CHARGE PUMP, AND OPERATION METHOD OF THE MEMORY DEVICE

CROSS-REFERENCE TO RELATED APPLICATION

This application claims benefit of priority to Korean Patent Application No. 10-2023-0032824, filed on Mar. 13, 2023, in the Korean Intellectual Property Office, the disclosure of which is incorporated by reference herein in its entirety.

BACKGROUND

The present disclosure relates to memory devices, and more particularly, to a memory device including a charge pump that generates a voltage for a memory operation, and an operation method of the memory device.

Memory devices are storage devices that store data and read it when needed. Memory devices can be roughly divided into non-volatile memories in which stored data do not disappear even when power is not supplied, and volatile memories in which stored data disappear when power is not supplied. Memory devices include a charge pump to generate voltages of various levels that are used in a memory operation of storing data or reading data.

As the degree of integration and an operating speed of memory devices have recently increased, the importance of effective operations of the charge pump has been being highlighted. The high peak of a current flowing into an input of the charge pump negatively affects the overall operation of memory devices.

SUMMARY

The present disclosure relates to a memory device for sensing a current flowing into an input of a charge pump, and controlling the sensed current to a threshold level or less to support a stable memory operation, and an operation method of the memory device.

In some aspects, a memory device includes a memory cell array including a plurality of memory cells, a control logic configured to control a memory operation with respect to the plurality of memory cells, and a voltage generator configured to output a voltage for the memory operation. The voltage generator includes a charge pump configured to generate the voltage, and a peak control circuit configured to sense a current flowing from a pad, to which an external voltage is applied, to the charge pump and control a peak of the current to be a threshold level or less based on a result of the sensing.

In other aspects, an operation method of a memory device includes sensing a current flowing from a pad, to which an external voltage is applied, to a charge pump and a voltage drop due to a path resistance, comparing the sensed voltage drop with a reference voltage, based on a result of the comparison, generating a second control signal from a first control signal for causing a level of a voltage generated by the charge pump to reach a target level, and providing the second control signal to the charge pump to control a peak of the current to be a threshold level or less.

In other aspects, an operation method of a memory device includes sensing a current flowing from a pad, to which an external voltage is applied, to a charge pump and a voltage drop due to a path resistance, comparing the sensed voltage drop with a reference voltage, adjusting at least one of a frequency and a magnitude of a clock signal so that a peak of the current is less than or equal to a threshold level, based on a result of the comparison, generating a control signal for causing a level of a voltage generated by the charge pump to reach a target level, in synchronization with an adjusted clock signal, and providing the control signal to the charge pump.

In other aspects, a memory system includes a first memory device and a second memory device. The first memory device is configured to sense a first current flowing from a first pad, to which an external voltage is applied, to a first charge pump based on a first value of at least one parameter related to peak control, and control a peak of the first current to be a threshold level or less based on a result of the sensing of the first current. The second memory device is configured to sense a second current flowing from a second pad, to which the external voltage is applied, to a second charge pump based on a second value of the at least one parameter, and control a peak of the second current to be the threshold level or less based on a result of the sensing of the second current. The first value corresponds to a process, voltage, temperature (PVT) variation of the first memory device, and the second value conforms to a PVT variation of the second memory device.

BRIEF DESCRIPTION OF THE DRAWINGS

The above and other aspects, features, and advantages of the present disclosure will be more clearly understood from the following detailed description, taken in conjunction with the accompanying drawings.

DETAILED DESCRIPTION OF THE EMBODIMENTS

Figure 1:
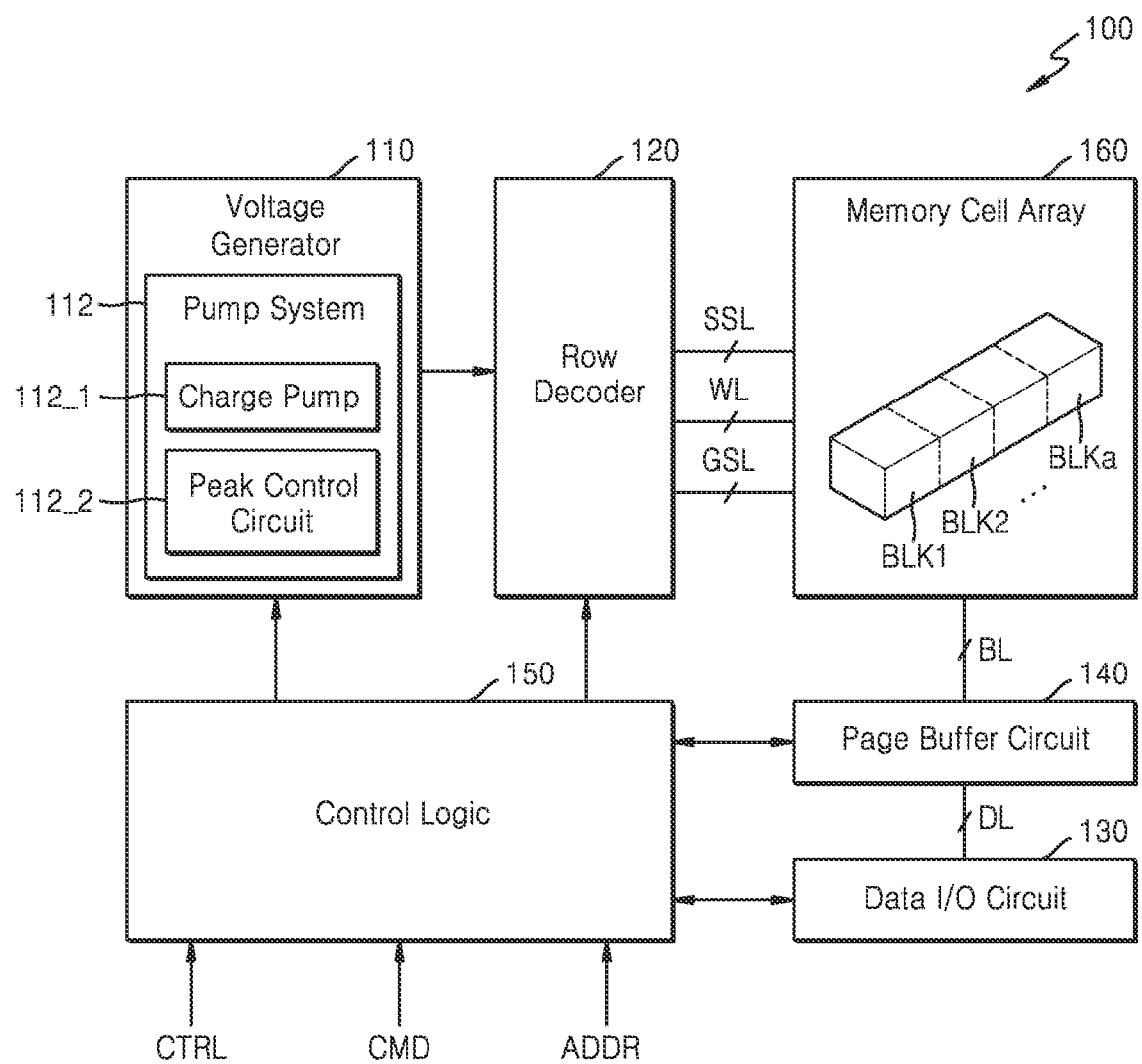
FIG. 1 is a schematic block diagram of an example memory device according to an embodiment.

FIG. 1 is a schematic block diagram of an example memory device 100 according to an embodiment.

Referring to FIG. 1, the memory device 100 may include a voltage generator 110, a row decoder 120, a data input/output (I/O) circuit 130, a page buffer circuit 140, and a memory cell array 160.

For example, a memory device may include a NAND flash memory, a vertical NAND (VNAND) flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM). Embodiments are described on the premise of a memory device including a vertical NAND flash memory, but it will be fully understood that the technical spirit of the concept is applicable to various types of memory devices described above.

The voltage generator 110 may include a pump system 112. The voltage generator 110 may output a voltage necessary for a memory operation by using an external voltage by using the pump system 112. For example, the voltage may include a program voltage, a pass voltage, a read voltage, a verify voltage, an erase voltage, a bit line voltage, and a common source line voltage. In FIG. 1, the voltage output by the voltage generator 110 is illustrated as being provided only to the row decoder 120. However, embodiments are not limited thereto, and the voltage output by the voltage generator 110 may be applied to other blocks such as the page buffer circuit 140. In this specification, embodiments are described as the voltage generator 110 including the separate pump system 112, but this is only an embodiment. Thus, embodiments are not limited thereto, and the pump system 112 may be understood as the voltage generator 110 itself rather than a component included in the voltage generator 110, and an operation of the pump system 112 may be interpreted as an operation of the voltage generator 110.

According to an embodiment, the pump system 112 may include a charge pump 112_1 and a peak control circuit 112_2. The charge pump 112_1 may generate voltages of various levels for a memory operation by using an external voltage. In this specification, the external voltage may also be referred to as a power voltage. The charge pump 112_1 may receive a control signal from a pump control circuit (not shown) included in the pump system 112, and generate a voltage having a target level based on the control signal.

According to an embodiment, the peak control circuit 112_2 may sense a current flowing to the charge pump 112_1 from a pad (not shown) to which the external voltage is applied, and may control the peak of the sensed current to be a threshold level or less based on a sensing result.

According to an embodiment, when the sensed current reaches the threshold level, the peak control circuit 112_2 may control the charge pump 112_1 in a direction for temporarily reducing an increase range of the voltage of the charge pump 112_1, or temporarily delaying an increase in the voltage. For example, the peak control circuit 112_2 may control the peak of the sensed current by adjusting the control signal generated by the pump control circuit (not shown) and providing the adjusted control signal to the charge pump 112_1. As another example, the peak control circuit 112_2 may control the peak of the sensed current by adjusting at least one of a frequency and a magnitude of a clock signal synchronized for the pump control circuit (not shown) to generate the control signal. As another example, the peak control circuit 112_2 may be integrated with the pump control circuit (not shown) to generate the control signal based on a current level of the voltage of the charge pump 112_1 and the level of the sensed current, and provide the generated control signal to the charge pump 112_1 to thereby control the peak of the sensed current.

According to an embodiment, the peak control circuit 112_2 may control the peak of the sensed current based on the value of at least one parameter related to the control of the peak of the sensed current. The at least one parameter may include at least one of a first parameter related to a reference voltage and a second parameter related to an offset applied for accurate current sensing. A value of the at least one parameter may be pre-determined based on at least one of a PVT variation of the memory device 100 and a threshold level.

The row decoder 120 may select at least one of a plurality of memory blocks BLK1 through BLKa in response to an address (ADDR). The row decoder 120 may be connected to the memory cell array 160 via a plurality of word lines (WL), at least one cell string select line (SSL), and at least one ground select line (GSL).

The row decoder 120 may select a WL, a SSL, and a GSL by using the voltage output by the voltage generator 110 and a decoded row address. The row decoder 120 may decode a column address among input addresses. The decoded column address may be transmitted to the data I/O circuit 130.

The data I/O circuit 130 may be connected to a control logic 150 via A bit line (BL). The data I/O circuit 130 may perform operations such as input and output, based on an operation signal from the control logic 150. The data I/O circuit 130 may provide, to the control logic 150, at least one of an ADDR, a command (CMD), and a memory control signal (CTRL) received from a memory controller (not shown).

The page buffer circuit 140 may receive an operation signal from the control logic 150. The page buffer circuit 140 may perform memory operations such as program, read, and erase, based on an operation signal received from the control logic 150.

The page buffer circuit 140 may be connected to the memory cell array 160 via the BL. The page buffer circuit 140 may provide a voltage suitable for each memory operation to the BL. The voltage provided by the page buffer circuit 140 may be the voltage output by the voltage generator 110.

The control logic 150 may generate an operation signal for memory operations such as program, read, and erase, based on at least one of the CMD and the CTRL from the memory controller (not shown). The control logic 150 may provide the generated operation signal to at least one of the voltage generator 110, the row decoder 120, the page buffer circuit 140, and the data I/O circuit 130. According to need, the memory device 100 may include more elements than those shown in FIG. 1.

The memory cell array 160 may include the plurality of memory blocks BLK1 through BLKa. Each of the plurality of memory blocks BLK1 through BLKa may be connected to the row decoder 120 through the plurality of WLs, the at least one SSL, the at least one GSL, and the common source line (not shown). Each of the plurality of memory blocks BLK1 through BLKa may be connected to the page buffer circuit 140 through a plurality of BLs.

The pump system 112 according to an embodiment may sense a current flowing from a pad to which an external voltage is applied to the charge pump 112_1, and control the peak of the sensed current to be a threshold level or less based on the sensing result, so that the charge pump 112_1 may perform a stable and effective voltage generation operation. Furthermore, the pump system 112 according to an embodiment may support a stable operation of the memory device 100 by effectively satisfying the limit for the peak of an internal current required by the memory device 100.

Figure 2A:
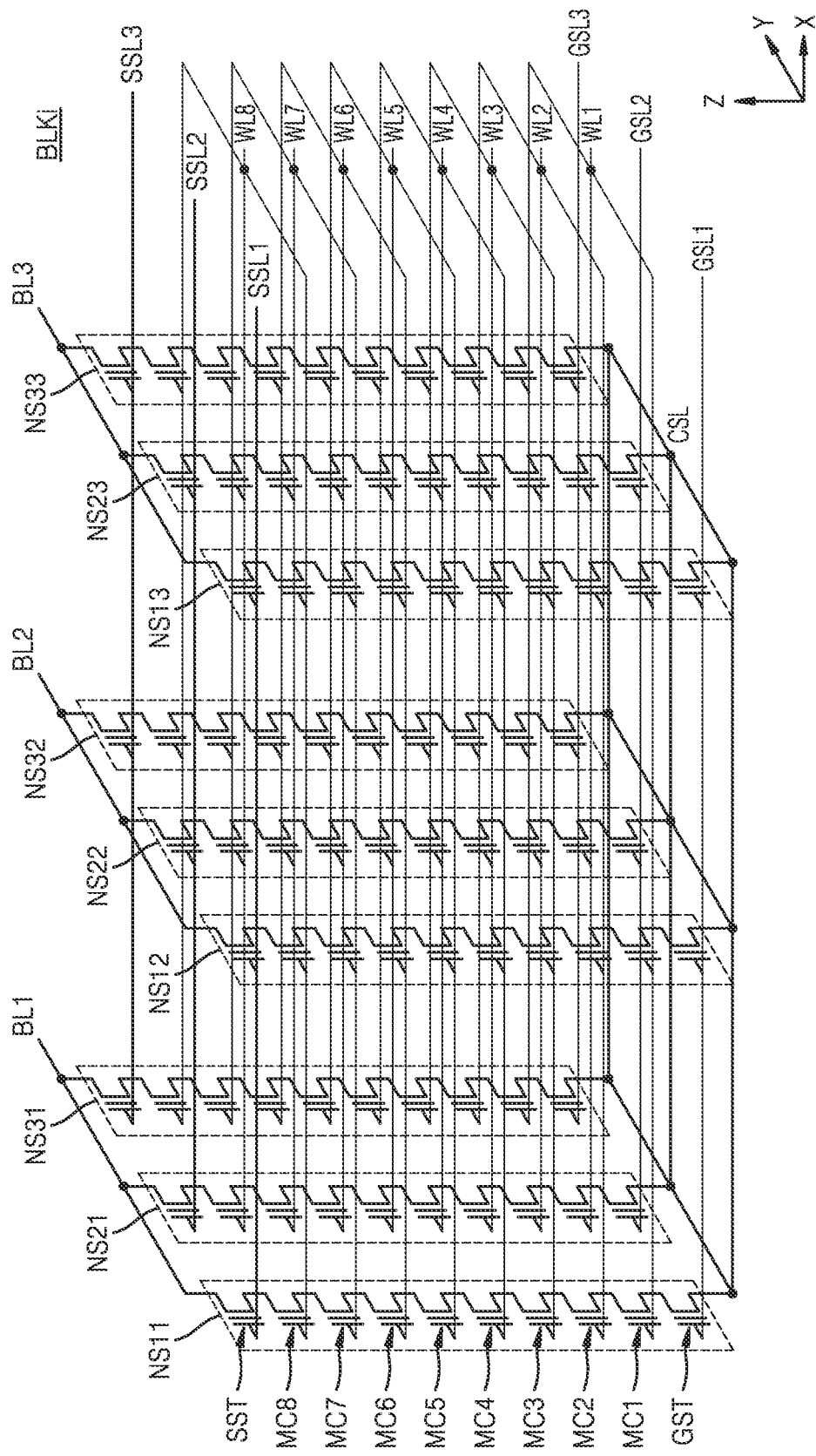
FIGS. 2A through 2C are diagrams illustrating a three-dimensional (3D) VNAND structure applicable to the example memory device of FIG. 1.
Figure 2B:
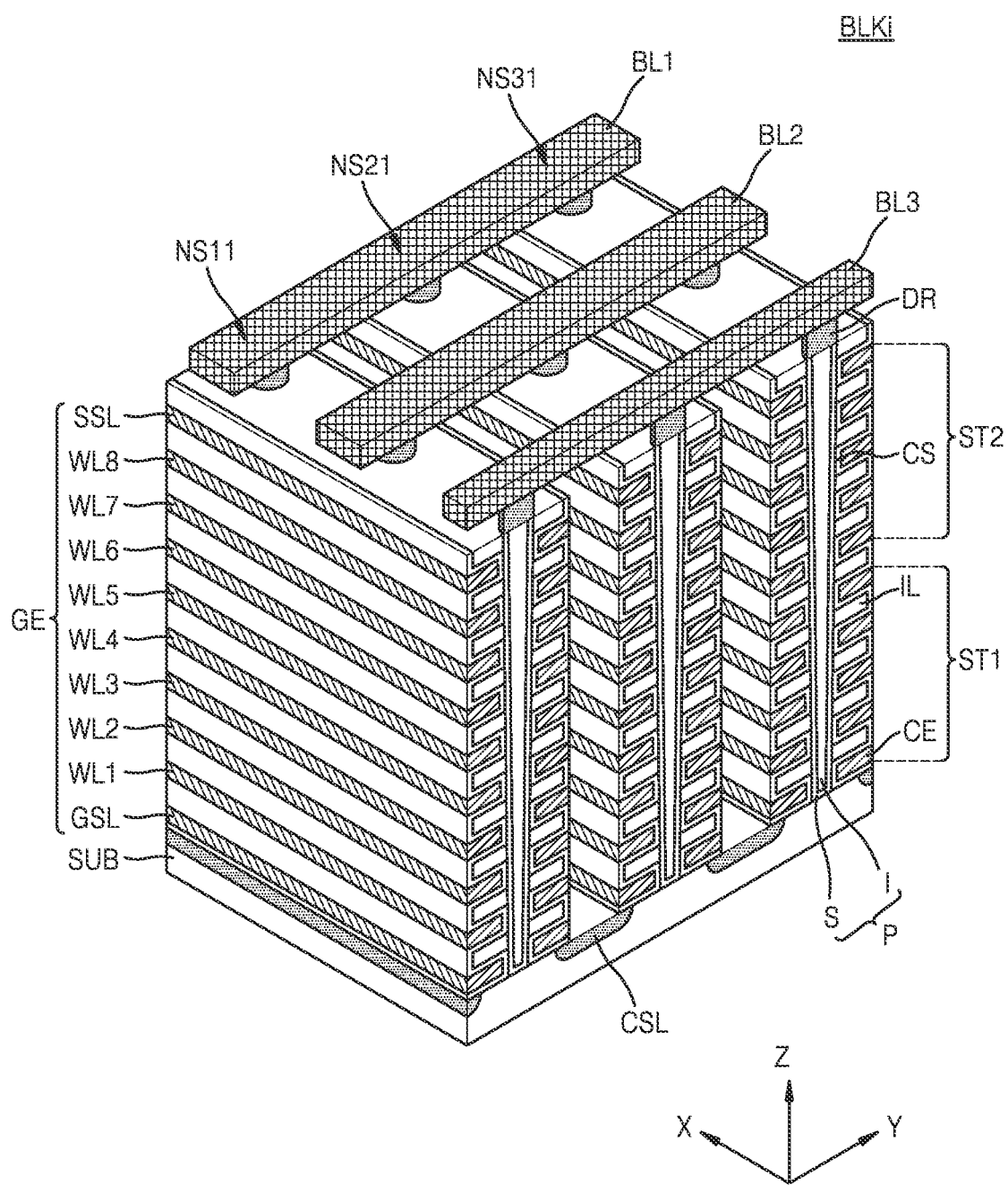
Figure 2C:
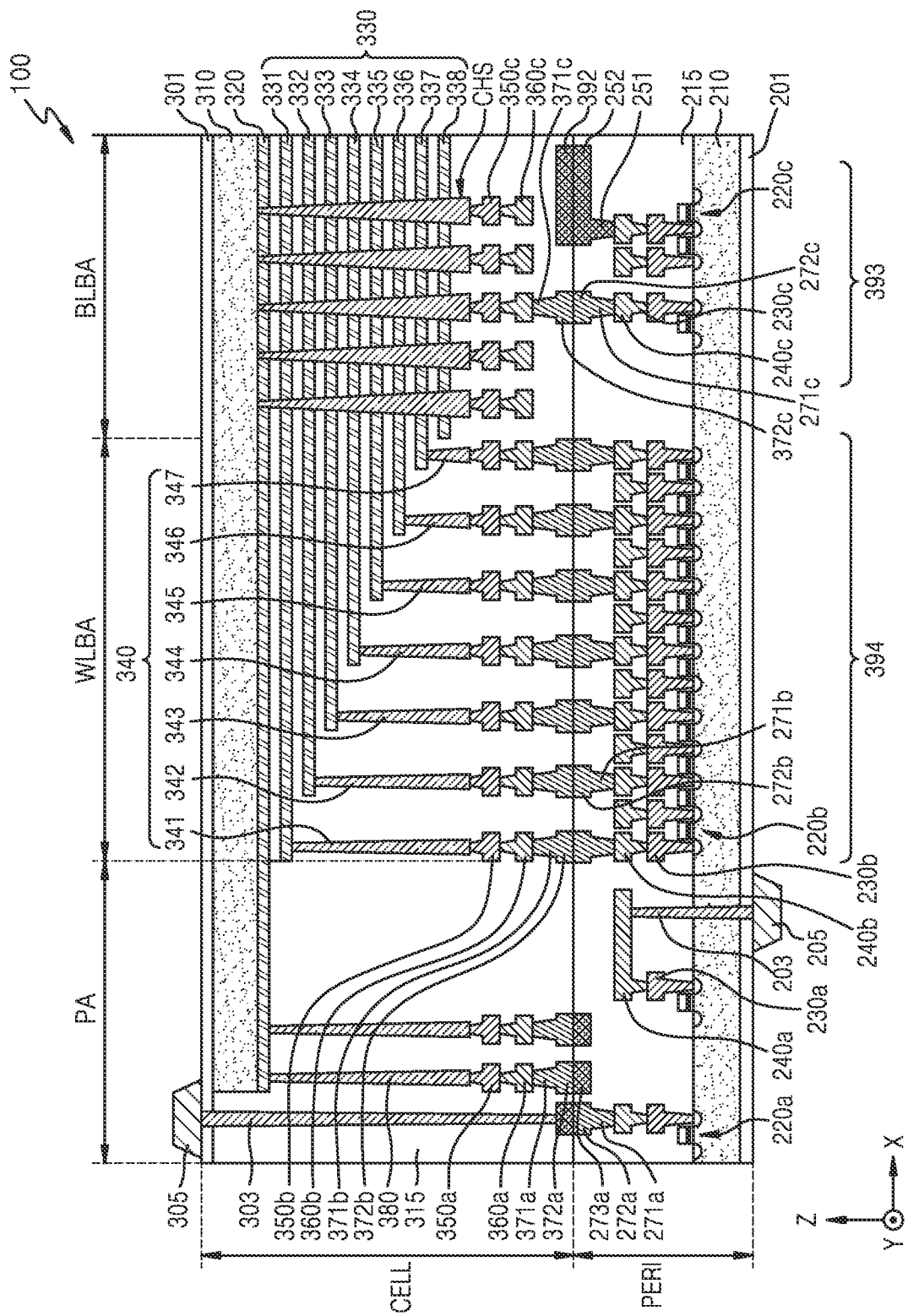

FIGS. 2A through 2C are diagrams illustrating a 3D VNAND structure applicable to the memory device 100 of FIG. 1. FIGS. 2A and 2B illustrate the structure of one memory block BLKi among the plurality of memory blocks BLK1 through BLKa of FIG. 1, and FIG. 2C illustrates the structure of the memory device 100 of FIG. 1.

Referring to FIG. 2A, the memory block BLKi may include a plurality of memory NAND strings NS11 through NS33, namely, memory NAND strings NS11, NS21, NS31, NS12, NS22, NS32, NS13, NS23, and NS33, connected between bit lines BL1, BL2, and BL3 and a common source line (CSL). Each of the plurality of memory NAND strings NS11 through NS33 may include a string select transistor (SST), a plurality of memory cells MC1 through MC8, namely, memory cells MC1, MC2, MC3, MC4, MC5, MC6, MC7 and MC8, and a ground select transistor (GST). For brevity of the drawings, FIG. 2A shows that each of the plurality of memory NAND strings NS11 through NS33 includes eight memory cells MC1 through MC8, but embodiments are not necessarily limited thereto.

The SST may be connected to string select lines SSL1, SSL2, and SSL3 corresponding thereto. The plurality of memory cells MC1 through MC8 may be connected to gate lines GTL1 through GTL8, respectively, corresponding thereto. The gate lines GTL1 through GTL8 may correspond to word lines, and some of the gate lines GTL1 through GTL8 may correspond to dummy word lines. The GST may be connected to ground select lines GSL1, GSL2, and GSL3 corresponding thereto. The SST may be connected to the corresponding bit lines BL1 through BL3, and the GST may be connected to the CSL.

Gate lines (e.g., GTL1) having the same height may be connected in common, and the ground select lines GSL1, GSL2, and GSL3 and the string select lines SSL1, SSL2, and SSL3 may be separated from each other. In FIG. 2A, a memory block (BLK) is illustrated as being connected to the eight gate lines GTL1 through GTL8 and the three bit lines BL1, BL2, and BL3. However, embodiments are not necessarily limited thereto.

Referring further to FIG. 2B, the memory block BLKi is formed in a vertical direction with respect to a substrate (SUB). The memory cells constituting the memory NAND strings NS11 through NS33 are formed by being stacked on a plurality of semiconductor layers.

The CSL extending in a first direction (Y direction) is provided on the SUB. On a region of the SUB between two adjacent CSLs, a plurality of insulation layers (ILs) each extending in the first direction may be sequentially provided in a third direction (Z direction), and the plurality of ILs may be spaced apart from one another by a certain distance in the third direction (Z direction). On the region of the SUB between two adjacent CSLs, a plurality of pillars P are provided by being sequentially arranged in the first direction (Y direction) and penetrating through the plurality of ILs in the third direction (Z direction). The plurality of pillars P may penetrate through the plurality of ILs to thereby contact the SUB. A surface layer S of each pillar P may include a silicon material of a first conductivity type and may function as a channel region.

An internal layer I of each pillar P may include an insulating material, such as silicon oxide, or an air gap. In a region between two adjacent CSLs, a charge storage layer (CS) is provided along exposed surfaces of the ILs, the pillars P, and the SUB. The CS may include a gate insulation layer (or a tunnel insulation layer), a charge trapping layer, and a blocking insulation layer. In the region between two adjacent CSLs, a gate electrode (GE), such as the select lines GSL and SSL and the word lines WL1 through WL8, is also provided on an exposed surface of the CS. Drains or drain contacts (DR) may be provided on the plurality of pillars P. The bit lines BL1, BL2, and BL3, each extending in the second direction (X direction) and spaced apart from each other by a certain distance in the first direction (Y direction), may be provided on the DR.

As shown in FIG. 2B, each of the memory NAND strings NS11 through NS33 may be implemented in a structure in which a first memory stack ST1 and a second memory stack ST2 are stacked one on another. The first memory stack ST1 is connected to the CSL, the second memory stack ST2 is connected to the bit lines BL1 through BL3, and the first memory stack ST1 and the second memory stack ST2 are stacked to share a channel hole with each other.

Referring further to FIG. 2C, a first non-volatile memory 100 may be a chip to chip (C2C) structure. The C2C structure may refer to manufacturing an upper chip including a cell region (CELL) on a first wafer, manufacturing a lower chip including a peripheral circuit region (PERI) on a second wafer, and then connecting the upper chip to the lower chip via bonding. For example, the bonding may refer to a method of electrically connecting a bonding metal formed on an uppermost metal layer of the upper chip to a bonding metal formed on an uppermost metal layer of the lower chip. For example, when the bonding metal is formed of copper (Cu), the bonding may be Cu—Cu bonding, and the bonding metal may be formed of aluminum (Al) or tungsten (W).

Each of a PERI and a CELL of the first non-volatile memory 100 may include an external pad bonding area (PA), a word line bonding area (WLBA), and a bit line bonding area (BLBA).

The PERI may include a first substrate 210, an interlayer insulation layer 215, a plurality of circuit devices 220a, 220b, and 220c formed on the first substrate 210, first metal layers 230a, 230b, and 230c connected to the plurality of circuit devices 220a, 220b, and 220c, respectively, and second metal layers 240a, 240b, and 240c formed on the first metal layers 230a, 230b, and 230c. According to an embodiment, the first metal layers 230a, 230b, and 230c may be formed of tungsten having relatively high electrical specific resistivity, and the second metal layers 240a, 240b, and 240c may be formed of copper having relatively electrical specific resistivity.

In the present specification, only the first metal layers 230a, 230b, and 230c and the second metal layers 240a, 240b, and 240c are illustrated and described. However, embodiments are not limited thereto, and one or more metal layers may be further formed on the second metal layers 240a, 240b, and 240c. At least some of the one or more metal layers formed above the second metal layer 240a, 240b, and 240c may be formed of aluminum or the like having lower electrical specific resistivity than copper used to form the second metal layers 240a, 240b, and 240c.

The interlayer insulation layer 215 may be disposed on the first substrate 210 to cover the plurality of circuit devices 220a, 220b, and 220c, the first metal layers 230a, 230b, and 230c, and the second metal layers 240a, 240b, and 240c, and may include an insulation material such as silicon oxide or silicon nitride.

Lower bonding metals 271b and 272b may be formed on the second metal layer 240b of the WLBA. In the WLBA, the lower bonding metals 271b and 272b of the PERI may be electrically connected to upper bonding metals 371b and 372b of the CELL via bonding, and the lower bonding metals 271b and 272b and the upper bonding metals 371b and 372b may be formed of aluminum, copper, tungsten, or the like.

The CELL may provide at least one memory block. The CELL may include a second substrate 310 and a common source line 320. On the second substrate 310, a plurality of word lines 331 through 338 (330) may be stacked in a direction perpendicular to an upper surface of the second substrate 310 (Z-axis direction). String selection lines and a ground selection line may be arranged above and below the plurality of word lines 330, respectively, and the plurality of word lines 330 may be arranged between the string selection lines and the ground selection line.

In the BLBA, a channel structure (CH) may extend in the direction perpendicular to the upper surface of the second substrate 310 and may penetrate through the word lines 330, the string selection lines, and the ground selection line. The CH may include a data storage layer, a channel layer, and a buried insulation layer, and the channel layer may be electrically connected to a first metal layer 350c and a second metal layer 360c. For example, the first metal layer 350c may be a bit line contact, and the second metal layer 360c may be a bit line. According to an embodiment, the bit line 360c may extend in the first direction (Y direction) parallel to an upper surface of the second substrate 310.

An area where the CH, the bit line 360c, and the like are arranged may be defined as the bit line bonding area BLBA. The bit line 360c may be electrically connected to circuit devices 220c that provide a page buffer 393 in the PERI in the bit line bonding area BLBA. For example, the bit line 360c may be connected to upper bonding metals 371c and 372c in the PERI, and the upper bonding metals 371c and 372c may be connected to lower bonding metals 271c and 272c connected to the circuit devices 220c of the page buffer 393.

In the WLBA, the word lines 330 may each extend in a second direction (X-axis direction) perpendicular to the first direction and also parallel to the upper surface of the second substrate 310, and may be connected to a plurality of cell contact plugs 341 through 347 (340). The word lines 330 may be connected to the cell contact plugs 340 in pads where at least some of the word lines 330 extend with different lengths in the second direction and are provided. A first metal layer 350b and a second metal layer 360b may be sequentially connected to upper ends of the cell contact plugs 340 connected to the word lines 330. In the WLBA, the cell contact plugs 340 may be connected to the PERI through the upper bonding metals 371b and 372b of the CELL and the lower bonding metals 271b and 272b of the PERI.

The cell contact plugs 340 may be electrically connected to circuit devices 220b that provide a row decoder 394 in the PERI. According to an embodiment, an operating voltage of the circuit devices 220b forming the row decoder 394 may be different from an operating voltage of the circuit devices 220c forming the page buffer 393. For example, the operating voltage of the circuit devices 220c forming the page buffer 393 may be greater than the operating voltage of the circuit devices 220b forming the row decoder 394.

In the PA, a common source line contact plug 380 may be disposed. The common source line contact plug 380 may be formed of a conductive material such as metal, a metal compound, or polysilicon, and may be electrically connected to the common source line 320. A first metal layer 350a and a second metal layer 360a may be sequentially stacked above the common source line contact plug 380. For example, an area where the common source line contact plug 380, the first metal layer 350a, and the second metal layer 360a are arranged may be defined as the PA.

In the PA, first and second I/O pads 205 and 305 may be arranged. A lower insulation layer 201 covering a lower surface of the first substrate 210 may be formed below the first substrate 210, and the first I/O pad 205 may be formed on the lower insulation layer 201. The first I/O pad 205 may be connected to at least one of the plurality of circuit devices 220a, 220b, and 220c arranged in the PERI through a first I/O contact plug 203, and may be separated from the first substrate 210 by the lower insulation layer 201. A lateral surface insulation layer may be arranged between the first I/O contact plug 203 and the first substrate 210 and may electrically separate the first I/O contact plug 203 from the first substrate 210.

An upper insulation layer 301 covering an upper surface of the second substrate 310 may be formed above the second substrate 310, and the second I/O pad 305 may be arranged on the upper insulation layer 301. The second I/O pad 305 may be connected to at least one of the plurality of circuit devices 220a, 220b, and 220c arranged in the PERI through a second I/O contact plug 303. According to an embodiment, the second I/O pad 305 may be electrically connected to the circuit device 220a.

According to embodiments, the second substrate 310, the common source line 320, and the like may not be arranged in an area where the second I/O contact plug 303 is arranged. The second I/O pad 305 may not overlap with the word lines 330 in the third direction (Z-axis direction). The second I/O contact plug 303 may be separated from the second substrate 310 in a direction parallel to the upper surface of the second substrate 310, and may be connected to the second I/O pad 305 by penetrating through the interlayer insulation layer 315 of the CELL.

According to embodiments, the first I/O pad 205 and the second I/O pad 305 may be selectively formed. For example, the first non-volatile memory 100 may include only the first I/O pad 205 arranged above the first substrate 210, or may include only the second I/O pad 305 arranged above the second substrate 310. Alternatively, the first non-volatile memory 100 may include both the first I/O pad 205 and the second I/O pad 305.

In the PA and the BLBA included in each of the CELL and the PERI, a metal pattern of a uppermost metal layer may exist as a dummy pattern or the uppermost metal layer may be empty.

In the PA, the first non-volatile memory 100 may form a lower metal pattern 273a on the uppermost metal layer of the PERI in correspondence with an upper metal pattern 372a formed on the uppermost metal layer of the CELL, the lower metal pattern 273a having the same shape as the upper metal pattern 372a of the CELL. The lower metal pattern 273a formed in the uppermost metal layer of the PERI may not be connected to a separate contact in the PERI. Similarly, in the PA, the first non-volatile memory 100 may form an upper metal pattern 373a on the uppermost metal layer of the CELL in correspondence with a lower metal pattern 273a formed on the uppermost metal layer of the PERI, the upper metal pattern having the same shape as the lower metal pattern 273a of the PERI.

The lower bonding metals 271b and 272b may be formed on the second metal layer 240b of the WLBA. In the WLBA, the lower bonding metals 271b and 272b of the PERI may be electrically connected to the upper bonding metals 371b and 372b of the CELL via bonding.

In the BLBA, the first non-volatile memory 100 may form an upper metal pattern 392 on the uppermost metal layer of the CELL in correspondence with a lower metal pattern 252 formed on the uppermost metal layer of the PERI, the upper metal pattern 392 having the same shape as the lower metal pattern 252 of the PERI. No contact may be formed on the upper metal pattern 392 formed on the uppermost metal layer of the CELL.

Figure 3A:
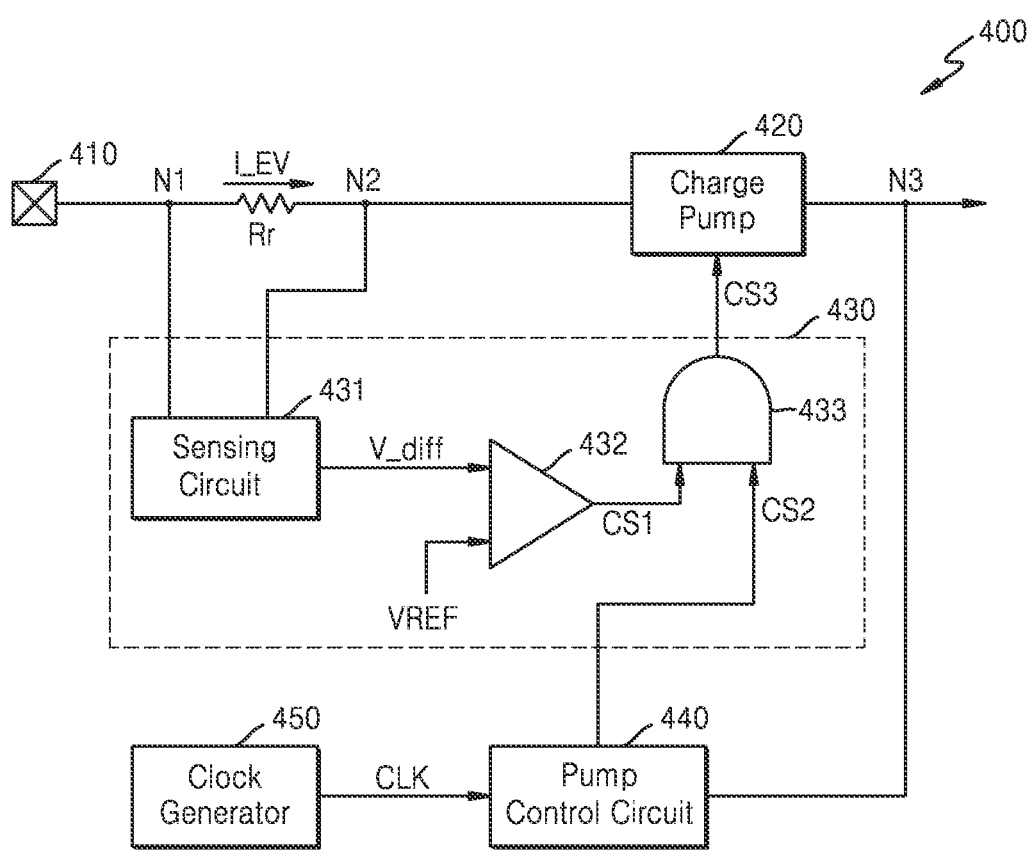
FIG. 3A is a block diagram of an example pump system according to an embodiment.
Figure 3B:
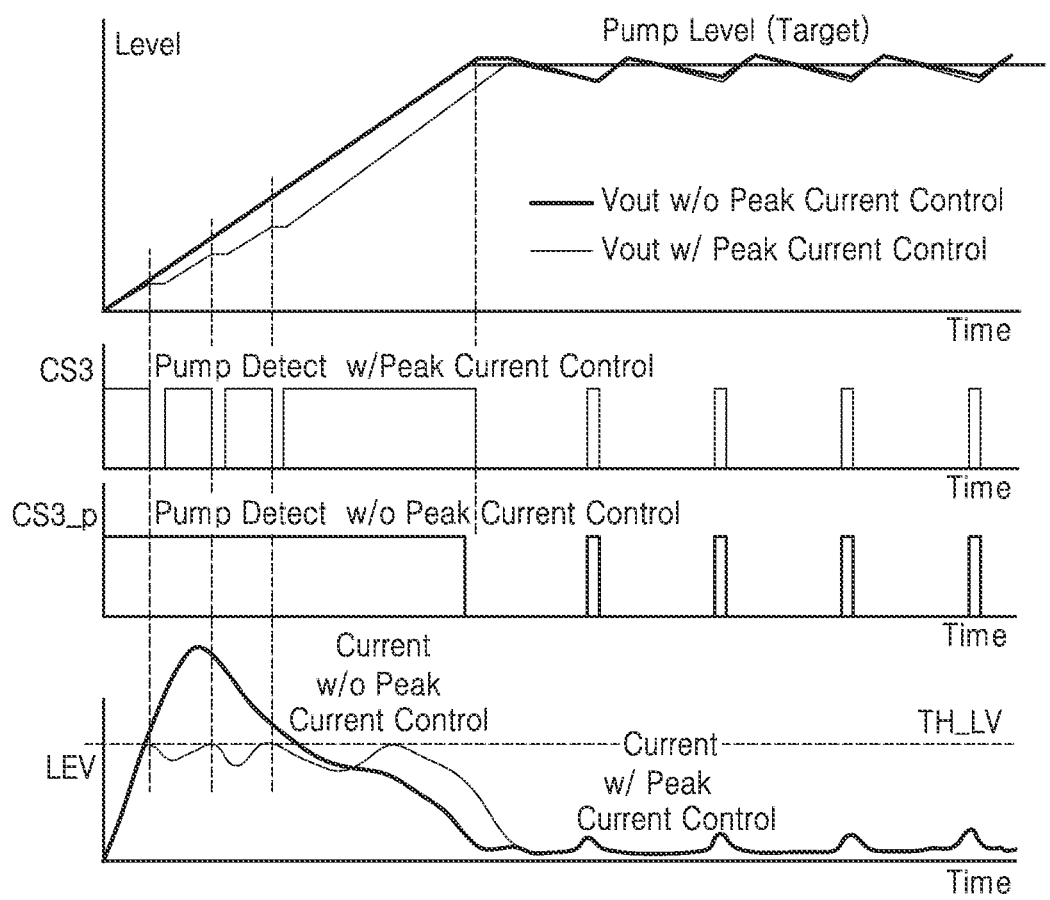
FIG. 3B is a graph illustrating control of a peak of a current by the example pump system.

FIG. 3A is a block diagram of an example pump system 400 according to an embodiment, and FIG. 3B is a graph illustrating control of a peak of a current I_EV by the pump system 400.

Referring to FIG. 3A, the pump system 400 may include a pad 410, a charge pump 420, a peak control circuit 430, a pump control circuit 440, and a clock generator 450. According to some embodiments, the clock generator 450 may be disposed as a separate component outside the pump system 400. The voltage generator 450 may include an oscillator. The clock generator 450 may further include a circuit capable of processing a frequency signal generated by the oscillator as a clock signal. Ideally, no resistance should exist between the pad 410 and the charge pump 420. However, in reality, various resistance components such as wiring resistance and parasitic resistance may exist. Resistance components between the pad 410 and the charge pump 420 may be defined herein as routing resistance Rr. The current I_EV may flow from the pad 410 to the charge pump 420 due to the routing resistance Rr, and a voltage drop may occur due to the current I_EV and the routing resistance Rr.

According to an embodiment, the peak control circuit 430 may include a sensing circuit 431, a comparison circuit 432, and a control signal output circuit 433. The sensing circuit 431 may sense the current I_EV. For example, the sensing circuit 431 may be connected to a first node N1 adjacent to the pad 410 and a second node N2 adjacent to the input of the charge pump 420, and may sense a voltage difference V_diff between a first voltage of the first node N1 and a second voltage of the second node N2. The voltage difference V_diff may have a proportional relationship with the current I_EV, and the sensing circuit 431 may generate the same result as sensing the current I_EV by sensing the voltage difference V_diff.

According to some embodiments, the sensing circuit 431 may scale the first voltage of the first node N1 and the second voltage of the second node N2, respectively, and then may sense a voltage difference V_diff between a scaled first voltage and a scaled second voltage. A detailed embodiment thereof will be described later with reference to FIG. 4.

According to an embodiment, the comparison circuit 432 may receive the voltage difference V_diff and a reference voltage VREF, and compare the voltage difference V_diff with the reference voltage VREF to generate a first control signal CS1 for controlling the peak of the current I_EV to be a threshold level or less, based on a result of the comparison. According to an embodiment, the reference voltage VREF may be determined according to a threshold level. For example, when the threshold level of the current I_EV of the memory device including the pump system 400 is limited to a specific level, the reference voltage VREF may be determined to have a level that corresponds to the specific level. According to an embodiment, the reference voltage VREF may be determined based on a PVT variation of the memory device including the pump system 400. In this specification, the PVT variation may be defined as a characteristic caused by a process issue of a memory device related to the current I_EV. According to an embodiment, the reference voltage VREF may be determined in advance based on at least one of a measured PVT variation of the memory device including the pump system 400 and a threshold level required by the memory device during a test phase for the memory device.

The pump control circuit 440 may receive a voltage output by the charge pump 420 (or the voltage of a third node N3) as feedback, and compare the level of the current voltage with a target level for a specific memory operation to thereby generate a second control signal CS2, based on a result of the comparison, In other words, the pump control circuit 440 may control the voltage level of the charge pump 420 to reach the target level through the second control signal CS2. The pump control circuit 440 may generate the second control signal CS2 by synchronizing with a clock signal CLK received from the clock generator 450.

According to an embodiment, the control signal output circuit 433 may receive the first control signal CS1 and the second control signal CS2, generate a third control signal CS3 based on the first control signal CS1 and the second control signal CS2, and provide the third control signal CS3 to the charge pump 420. The control signal output circuit 433 may selectively output the second control signal CS2 as the third control signal CS3, based on the first control signal CS1.

For example, the control signal output circuit 433 may be implemented as a logic circuit of an AND gate to perform the above-described operation. In detail, the control signal output circuit 433 may output a third control signal CS3 of logic low L in response to a first control signal CS1 of logic low L, when the voltage difference V_diff is greater than the reference voltage VREF, that is, when the current I_EV reaches a threshold level.

As another example, the control signal output circuit 433 may output the second control signal CS2 as the third control signal CS3 in response to a first control signal CSI of logic high H, when the voltage difference V_diff is equal to or less than the reference voltage VREF, that is, when the current I_EV does not reach the threshold level, and the charge pump 420 may output a voltage with a higher level than before, based on the third control signal CS3.

As such, when the current I_EV reaches the threshold level, the control signal output circuit 433 may provide to the charge pump 420 the third control signal CS3 of logic low L instead of the second control signal CS2 for increasing the voltage level of the charge pump 420 to the target level, thereby temporarily minimizing an increase in the current I_EV.

Referring further to FIG. 3B, the peak control circuit 430 may generate the third control signal CS3 for controlling the charge pump 420, based on the reference voltage VREF, the first control signal CS1, and the second control signal CS2. The third control signal CS3 may include a pulse pattern for controlling an operation of the charge pump 420 so that the peak of the current I_EV does not exceed a threshold level TH_LV. The charge pump 420 may operate based on the third control signal CS3 to stably generate an output voltage Vout (or the voltage of the third node N3) having a level that corresponds to the reference voltage VREF in a situation where the peak of the current I_EV is controlled to be less than the threshold level TH_LV.

When the charge pump 420 is controlled by a third control signal CS3_p in a comparative embodiment in which the peak of the current I_EV is not controlled, the peak of the current I_EV greatly exceeds the threshold level TH_LV, so that the memory device including the pump system 400 may be adversely affected.

Figure 4:
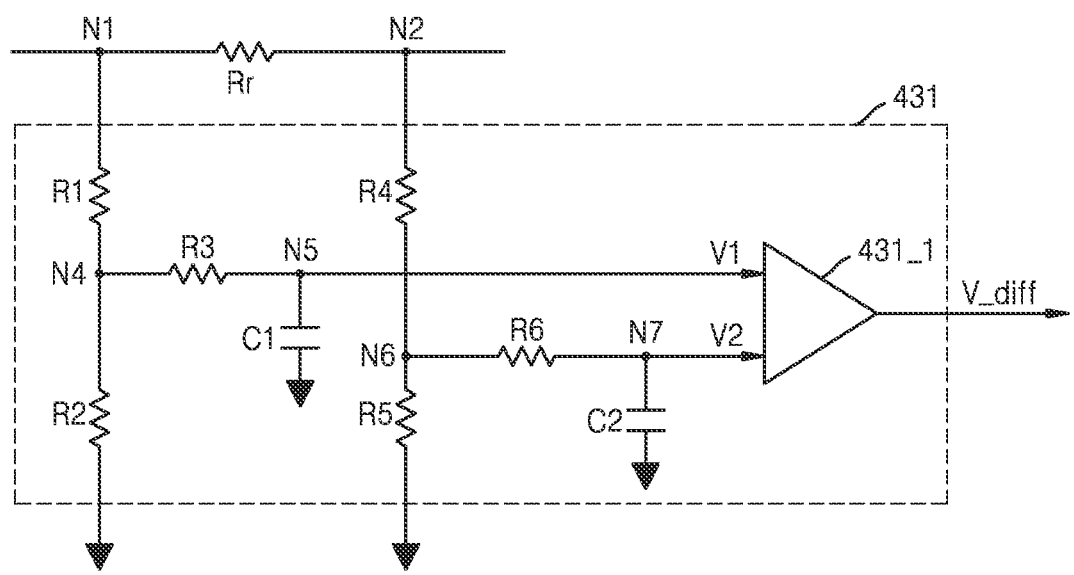
FIG. 4 is a circuit diagram of an embodiment of an example sensing circuit of FIG. 3A.

FIG. 4 is a circuit diagram of an embodiment of the sensing circuit 431 of FIG. 3A.

Referring to FIG. 4, the sensing circuit 431 may include a first resistor R1, a second resistor R2, a third resistor R3, a fourth resistor R4, a fifth resistor R5, a first capacitor C1, a sixth resistor R6, a second capacitor C2, and a differential amplification circuit 431_1.

One end of the first resistor R1 may be connected to the first node N1, and the other end of the first resistor R1 may be connected to a fourth node N4. One end of the second resistor R2 may be connected to the fourth node N4, and the other end of the second resistor R2 may be grounded. One end of the third resistor R3 may be connected to the fourth node N4, and the other end of the third resistor R3 may be connected to a fifth node N5. One end of the first capacitor C1 may be connected to the fifth node N5, and the other end of the first capacitor C1 may be grounded. A first voltage of the first node N1 may be divided by a ratio between the resistance value of the first resistor R1 and the resistance value of the second resistor R2 and may be input to the differential amplification circuit 431_1 as a first input voltage V1. The third resistor R3 and the first capacitor C1 may operate as a low-pass filter to remove high-frequency band noise included in the first input voltage V1.

One end of the fourth resistor R4 may be connected to the second node N2, and the other end of the fourth resistor R4 may be connected to a sixth node N6. One end of the fifth resistor R5 may be connected to the sixth node N6, and the other end of the fifth resistor R5 may be grounded. One end of the sixth resistor R6 may be connected to the sixth node N6, and the other end of the sixth resistor R6 may be connected to a seventh node N7. One end of the second capacitor C2 may be connected to the seventh node N7, and the other end of the second capacitor C2 may be grounded. A second voltage of the second node N2 may be divided by a ratio between the resistance value of the fourth resistor R4 and the resistance value of the fifth resistor R5 and may be input to the differential amplification circuit 431_1 as a second input voltage V2. The sixth resistor R6 and the second capacitor C2 may operate as a low-pass filter to remove high-frequency band noise included in the second input voltage V2.

The differential amplifier circuit 431_1 may generate and output a voltage difference V_diff between the first input voltage V1 and the second input voltage V2. As described above, the voltage difference V_diff may correspond to the level of the current I_EV of FIG. 3 flowing through the routing resistor Rr.

Figure 5:
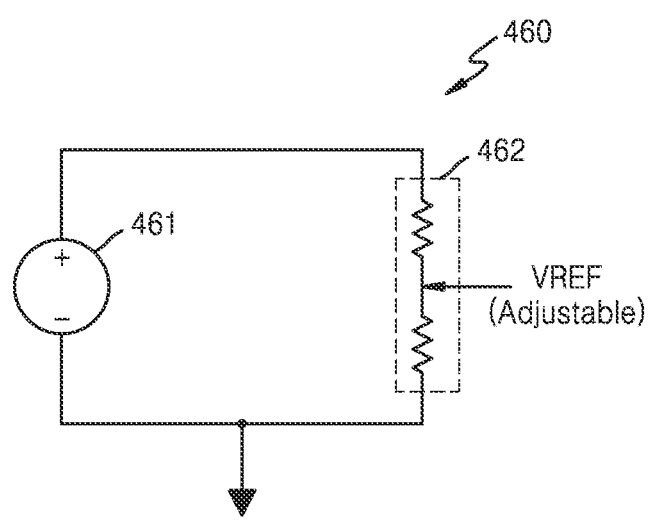
FIG. 5 is a circuit diagram of an example reference voltage generation circuit according to an embodiment.

FIG. 5 is a circuit diagram of an example reference voltage generation circuit 460 according to an embodiment. The reference voltage generation circuit 460 may be included in the pump system 400 of FIG. 3, or may be implemented as a separate component from the pump system 400 of FIG. 3.

Referring to FIG. 5, the reference voltage generation circuit 460 may include a voltage source 461 and a resistance circuit 462. The reference voltage VREF may be adjusted based on at least one of a PVT variation of a memory device including the reference voltage generation circuit 460 and a threshold level of the current I_EV of FIG. 3.

According to an embodiment, the level of the reference voltage VREF may be adjusted by adjusting a point (or node) at which a direct current (DC) voltage of the voltage source 461 is divided by the resistor circuit 462 and output.

Figure 6:
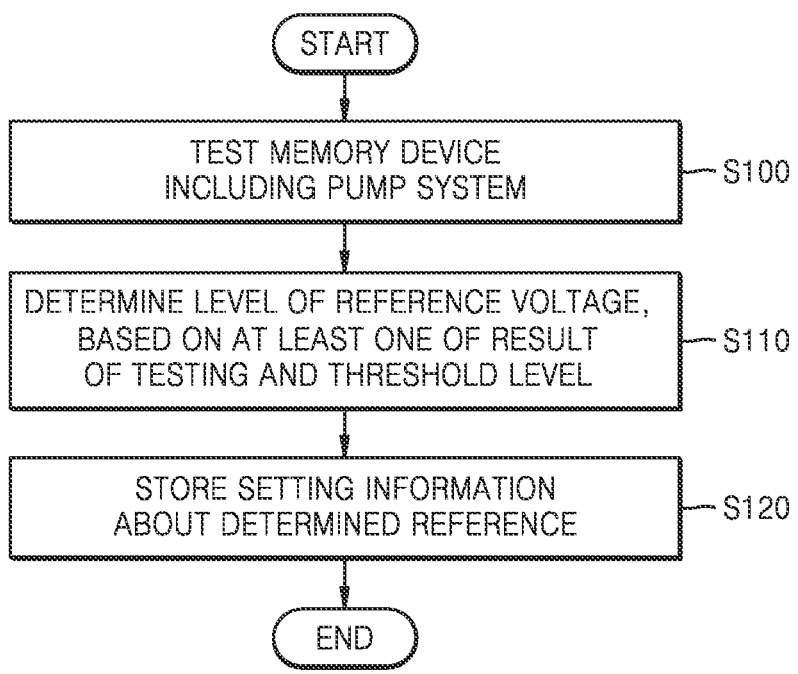
FIG. 6 is a flowchart of an example method of testing a memory device, according to an embodiment.

FIG. 6 is a flowchart of an example method of testing a memory device, according to an embodiment.

Referring to FIG. 6, in operation S100, a memory device including a pump system may be tested through a test device (e.g., a built-in self-test (BIST) circuit in the memory device). According to an embodiment, the test device may test a tendency of a current flowing through a routing resistor according to an operation of a charge pump in the pump system.

In operation S110, the test device may determine the level of a reference voltage, based on at least one of a result of the testing in operation S100 and a threshold level of an internal current (e.g., a current flowing through a routing resistor) limited by the memory device.

In operation S120, the test device may store setting information about the reference voltage determined in operation S110 in a memory area of the memory device. According to an embodiment, the setting information may include a value of a first parameter related to the reference voltage. The memory device may read the value of the first parameter from the memory area before performing a memory operation, and may prepare the reference voltage in advance by using the reference voltage generation circuit 460 of FIG. 5, based on the read value of the first parameter.

Figure 7A:
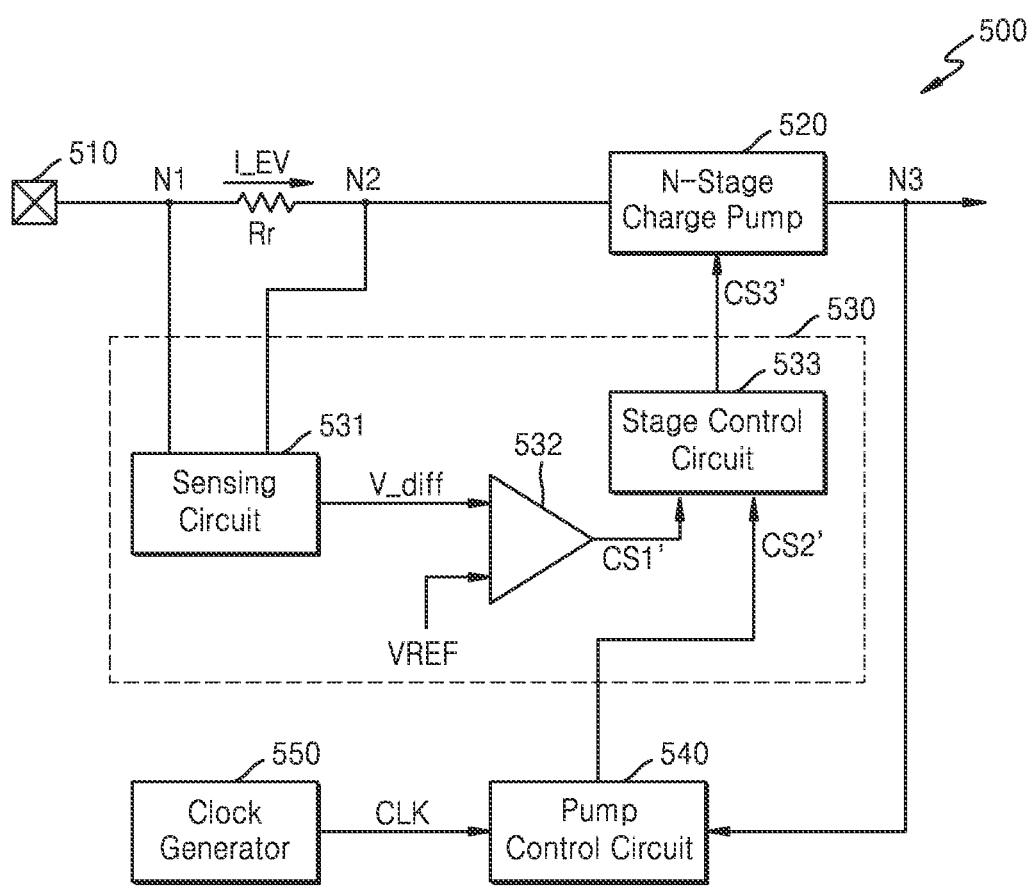
FIG. 7A is a block diagram of another example pump system according to an embodiment.
Figure 7B:
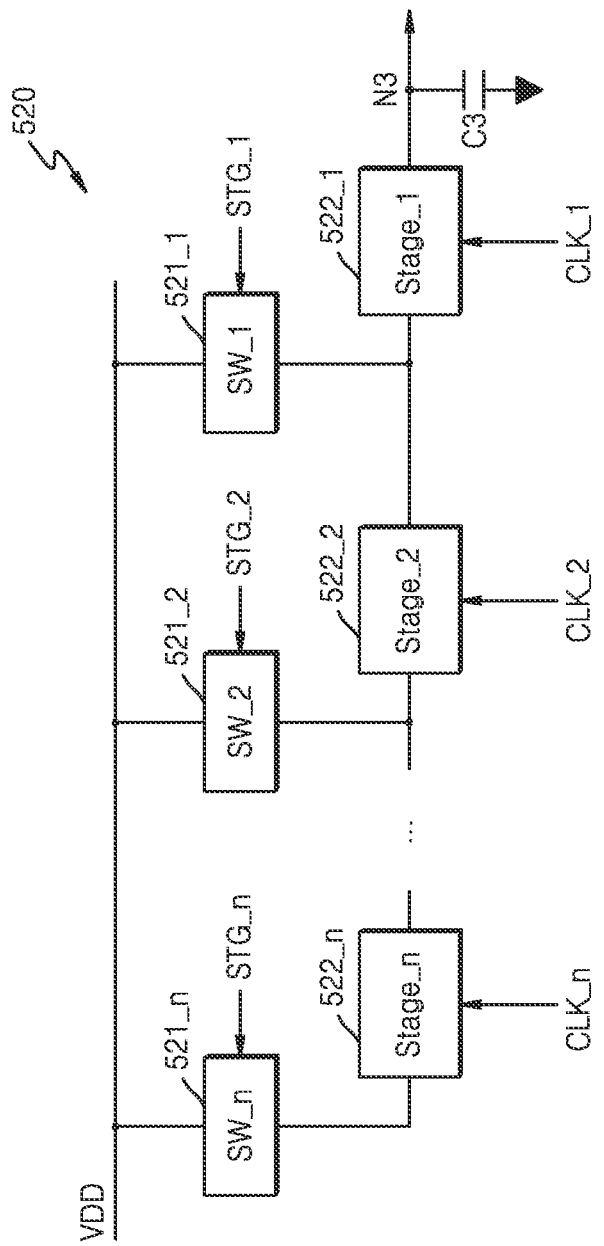
FIG. 7B is a block diagram of an example N-stage charge pump of FIG. 7A.

FIG. 7A is a block diagram of another example pump system 500 according to an embodiment, and FIG. 7B is a block diagram of an example N-stage charge pump 520 of FIG. 7A. For convenience of description, matters of FIGS. 7A and 7B that are the same as those of FIG. 3 will be omitted. According to an embodiment, the N-stage charge pump 520 may be implemented as a dickson charge pump or a pelliconi charge pump. The N-stage charge pump 520 may be implemented as a positive charge pump or a negative charge pump. The implementation of the N-stage charge pump 520 of FIGS. 7A and 7B is an embodiment, and it will be fully understood that the technical spirit of the concept is not limited thereto.

Referring to FIG. 7A, the pump system 500 may include a pad 510, the N-stage charge pump 520, a peak control circuit 530, a pump control circuit 540, and a clock generator 550.

According to an embodiment, the N-stage charge pump 520 may include N (where N is an integer greater than or equal to 2) stages. By controlling the number of activated stages among the N stages, the N-stage charge pump 520 may output a voltage whose level is changed in stages.

According to an embodiment, the peak control circuit 530 may include a sensing circuit 531, a comparison circuit 532, and a stage control circuit 533. The sensing circuit 531 may sense the current I_EV. For example, the sensing circuit 531 may be connected to a first node N1 adjacent to the pad 510 and a second node N2 adjacent to the input of the N-stage charge pump 520, and may sense a voltage difference V_diff between a first voltage of the first node N1 and a second voltage of the second node N2.

According to an embodiment, the comparison circuit 532 may receive the voltage difference V_diff and a reference voltage VREF, and compare the voltage difference V_diff with the reference voltage VREF to generate a first control signal CS1' for controlling the peak of the current I_EV to be a threshold level or less, based on a result of the comparison.

The pump control circuit 540 may receive a voltage output by the N-stage charge pump 520 (or the voltage of a third node N3) as feedback, and compare the level of the current voltage with a target level for a specific memory operation to thereby generate a second control signal CS2', based on a result of the comparison, In detail, the second control signal CS2' may be a signal for controlling the voltage level of the N-stage charge pump 520 to reach the target level by changing the number of activated stages among the N stages of the N-stage charge pump 520.

According to an embodiment, the stage control circuit 533 may receive the first control signal CS1' and the second control signal CS2', generate a third control signal CS3' based on the first control signal CS1' and the second control signal CS2', and provide the third control signal CS3' to the N-stage charge pump 520.

For example, when the voltage difference V_diff is greater than the reference voltage VREF, that is, when the current I_EV reaches a threshold level, the stage control circuit 533 may generate the third control signal CS3' from the second control signal CS2' in response to the first control signal CS1' indicating the aforementioned case. In detail, the stage control circuit 533 may generate a third control signal CS3' allowing fewer stages than the number of stages activated by the second control signal CS2' to be activated. In this case, a difference between the number of stages activated by the third control signal CS3' and the number of stages activated by the second control signal CS2' may be pre-determined based on a PVT variation of a memory device including the pump system 500. The N-stage charge pump 520 may output a voltage whose level is equal to or slightly increased from the level of a voltage previously output based on the third control signal CS3'.

As another example, when the voltage difference V_diff is equal to or less than the reference voltage VREF, that is, when the current I_EV does not reach the threshold level, the stage control circuit 533 may output the second control signal CS2' as the third control signal CS3' in response to a first control signal CS1' indicating the aforementioned case, and the N-stage charge pump 520 may output a voltage with a higher level than before, based on the third control signal CS3'.

As such, when the current I_EV reaches the threshold level, the stage control circuit 533 may provide to the N-stage charge pump 520 the third control signal CS3' for decreasing an increase range of the voltage level of the N-stage charge pump 520, thereby temporarily minimizing an increase in the current I_EV.

According to embodiments, the stage control circuit 533 may be implemented as a logic circuit of an AND gate, like the control signal output circuit 433 of FIG. 3. At this time, the stage control circuit 533 may selectively bypass the second control signal CS2' to the N-stage charge pump 520 according to the level of the first control signal CS1'.

Referring further to FIG. 7B, the N-stage charge pump 520 may include first through n-th switches 521_1 through 521_n, first through n-th stages 522_1 through 522_n, and a third capacitor C3. The first through nth stages 522_1 through 522_n may be connected to each other in a cascade, and may be connected to a power supply voltage VDD by the first through n-th switches 521_1 through 521_n. The first through nth switches 521_1 through 521_n may be switched by first through n-th stage switching signals STG_1 through STG_n. An output of the first stage 522_1 may be connected to the third node N3. One end of the third capacitor C3 may be connected to the third node N3, and the other end of the third capacitor C3 may be grounded.

The first through n-th switches 522_1 through 522_n may be activated by first through n-th stage clock signals CLK_1 through CLK_n. The N-stage charge pump 520 may output a voltage by pumping the power supply voltage VDD by using the activated stages.

The third control signal CS3' of FIG. 7A may include the first through n-th stage switching signals STG_1 through STG_n and the first through n-th stage clock signals CLK_1 through CLK_n of FIG. 7B.

However, because the example described with reference to FIGS. 7A and 7B is merely an embodiment, embodiments are not limited thereto. The peak control circuit 530 may be variously implemented so that the technical concept of the concept is applicable to variously implemented charge pumps.

Figure 8:
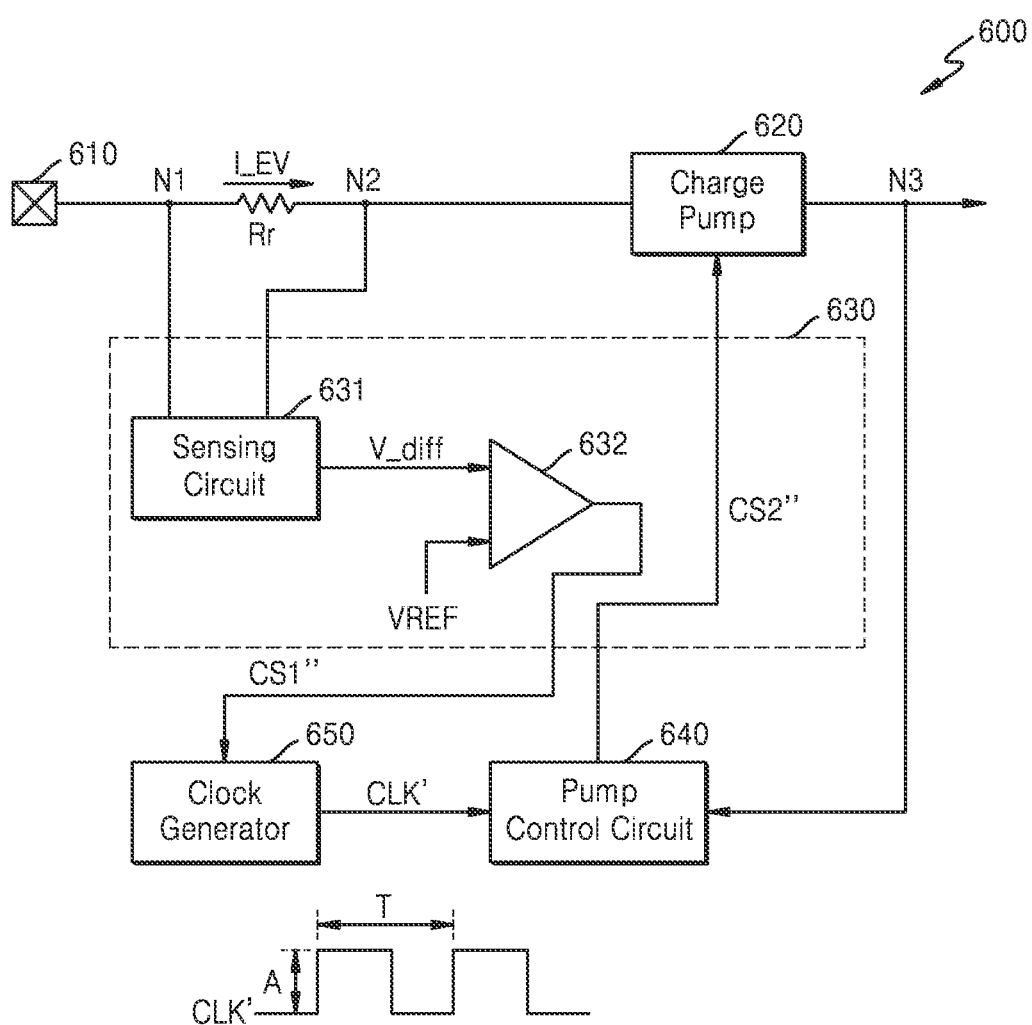
FIG. 8 is a schematic diagram of another example pump system according to an embodiment.

FIG. 8 is a schematic diagram of another example pump system 600 according to an embodiment. For convenience of description, matters of FIG. 8 that are the same as those of FIG. 3 will be omitted.

Referring to FIG. 8, the pump system 600 may include a pad 610, a charge pump 620, a peak control circuit 630, a pump control circuit 640, and a clock generator 650.

According to an embodiment, the peak control circuit 630 may include a sensing circuit 631, a comparison circuit 632, and a stage control circuit 633. The sensing circuit 631 may sense the current I_EV. For example, the sensing circuit 631 may be connected to a first node N1 adjacent to the pad 610 and a second node N2 adjacent to the input of the charge pump 620, and may sense a voltage difference V_diff between a first voltage of the first node N1 and a second voltage of the second node N2.

According to an embodiment, the comparison circuit 632 may receive the voltage difference V_diff and a reference voltage VREF, and compare the voltage difference V_diff with the reference voltage VREF to generate a first control signal CS1" for controlling the peak of the current I_EV to be a threshold level or less, based on a result of the comparison, and provide the first control signal CS1" to the clock generator 650.

For example, when the voltage difference V_diff is greater than the reference voltage VREF, that is, when the current I_EV reaches a threshold level, the clock generator 650 may adjust at least one of a frequency 1/T and a magnitude A of a previously output clock signal in response to the first control signal CS1" indicating the aforementioned case, and then provide an adjusted clock signal CLK' to the pump control circuit 640. The pump control circuit 640 may generate a second control signal CS2" based on a feedback received from the charge pump 620 in synchronization with the adjusted clock signal CLK', and provide the second control signal CS2" to the charge pump 620. The charge pump 620 may temporarily minimize an increase in the current I_EV by outputting a voltage that increases more slowly than before based on the second control signal CS2". In detail, as the frequency 1/T of the adjusted clock signal CLK' decreases, the frequency at which the pump control circuit 640 generates the second control signal CS2" decreases, and thus an increase rate of the voltage of the charge pump 620 due to the second control signal CS2" may be delayed. In addition, as the magnitude A of the adjusted clock signal CLK' decreases, the magnitude of the second control signal CS2" generated by the pump control circuit 640 also decreases, and thus an increase range of the voltage of the charge pump 620 due to the second control signal CS2" may be reduced, leading to temporary minimization of an increase in the current I_EV.

Figure 9:
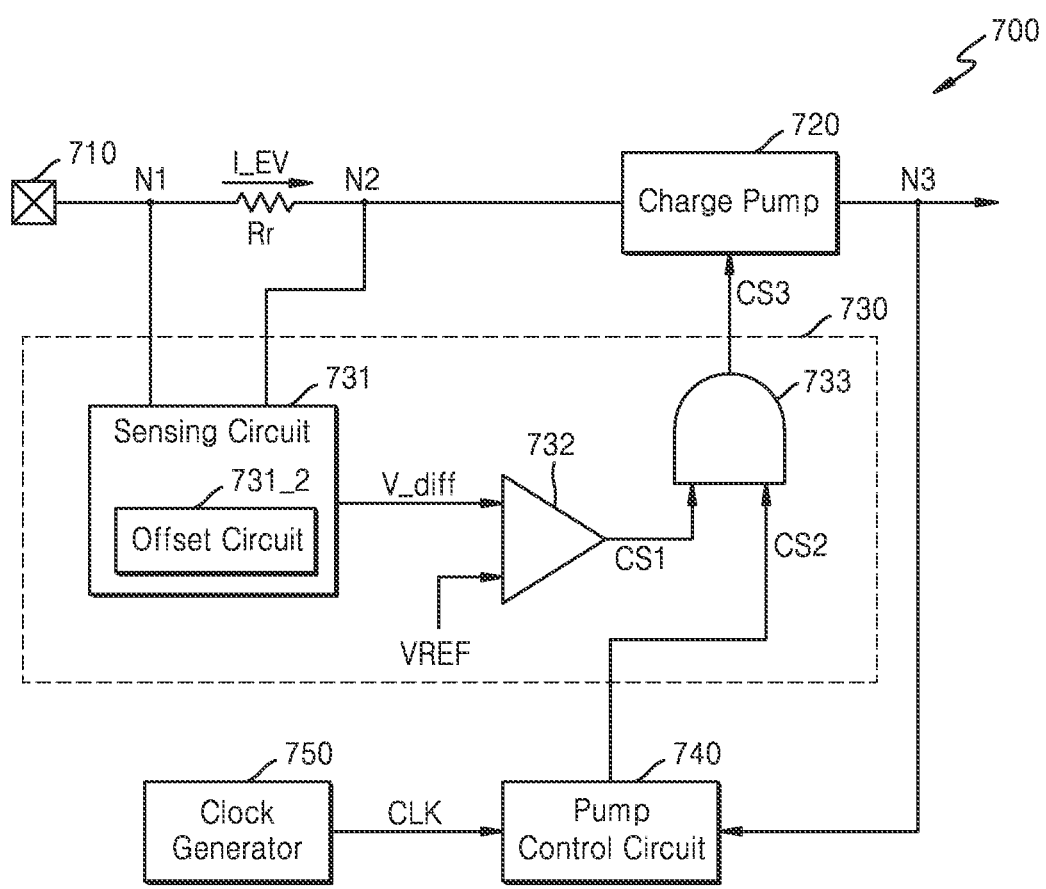
FIG. 9 is a schematic diagram of another example pump system according to an embodiment.

FIG. 9 is a schematic diagram of another example pump system 700 according to an embodiment. For convenience of description, matters of FIG. 9 that are the same as those of FIG. 3 will be omitted.

Referring to FIG. 9, the pump system 700 may include a pad 710, a charge pump 720, a peak control circuit 730, a pump control circuit 740, and a clock generator 750.

The peak control circuit 730 may include a sensing circuit 731, a comparison circuit 732, and a control signal output circuit 733. Compared with the sensing circuit 431 of FIG. 3, the sensing circuit 731 of FIG. 9 may include an offset circuit 731_2. The offset circuit 731_2 may apply an offset to inputs of the sensing circuit 731 so that the sensing circuit 731 may accurately measure a current I_EV flowing through a routing resistor Rr. According to an embodiment, the offset may be determined based on at least one of a PVT variation of a memory device including the pump system 700 and a threshold level of the current I_EV.

According to an embodiment, the offset circuit 731_2 may apply an offset to a first voltage of a first node N1 or a second voltage of a second node N2 before the sensing circuit 731 senses a voltage difference V_diff between the first voltage and the second voltage. According to embodiments, the offset circuit 731_2 may apply an offset to any one of a scaled first voltage and a scaled second voltage.

For example, the sensing circuit 731 may sense a voltage difference V_diff between the first voltage and an offset-applied second voltage (or between an offset-applied first voltage and the second voltage) and provide the sensed voltage difference V_diff to the comparison circuit 732.

Figure 10A:
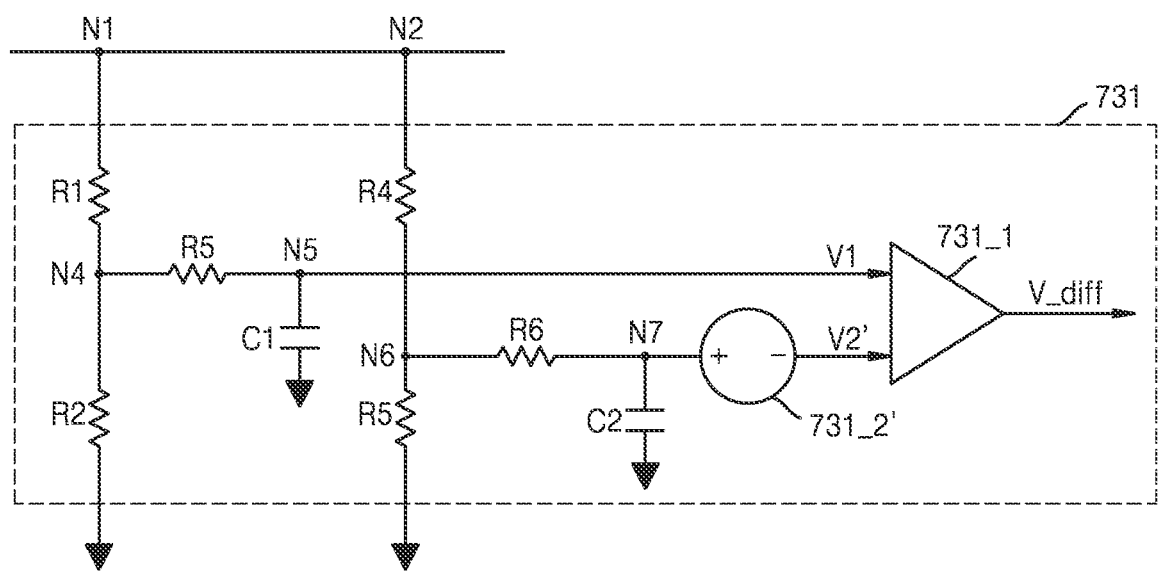
FIGS. 10A and 10B are circuit diagrams illustrating embodiments of an example sensing circuit of FIG. 9.
Figure 10B:
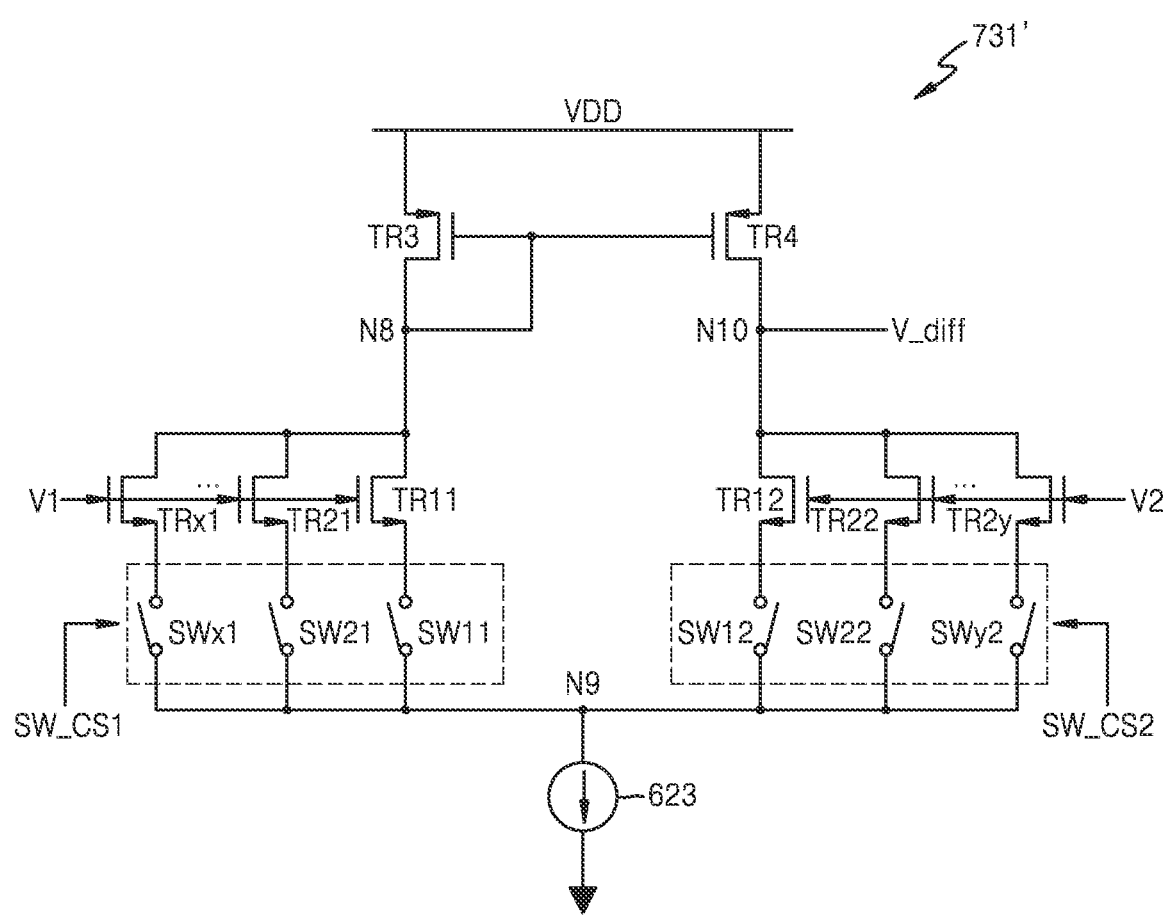

FIGS. 10A and 10B are circuit diagrams illustrating embodiments of the sensing circuit 731 of FIG. 9. For convenience of description, matters of FIG. 10A that are the same as those of FIG. 4 will be omitted. FIG. 10B illustrates a sensing circuit 731' focusing on the configurations of a differential amplification circuit 731_1 and an offset circuit 731_2' of FIG. 10A.

Referring to FIG. 10A, the sensing circuit 731 may include a first resistor R1, a second resistor R2, a third resistor R3, a fourth resistor R4, a fifth resistor R5, a first capacitor C1, a sixth resistor R6, a second capacitor C2, the differential amplification circuit 731_1, and the offset circuit 731_2'.

According to an embodiment, the offset circuit 731_2' may generate a second input voltage V2' by applying an offset to an input voltage generated from the voltage of the second node N2, and may provide the second input voltage V2' to the differential amplification circuit 731_1. The differential amplification circuit 431_1 may generate and output a voltage difference V_diff between a first input voltage V1 and the second input voltage V2'.

Referring further to FIG. 10B, the sensing circuit 731' may include a plurality of first transistors TR11 through TRx1, a plurality of first switches SW11 through SWx1, a plurality of second transistors TR12 through TRy2, a plurality of second switches SW12 through SWy2, a third transistor TR3, a fourth transistor TR4, and a current source 623.

The first transistors TR11 through TRx1 and the second transistors TR12 through TRy2 are implemented as n-type metal-oxide-semiconductor (nMOS) transistors, and the third transistor TR3 and the fourth transistor TR4 may be implemented as a p-type MOS (pMOS) transistors.

Respective drain terminals of the first transistors TR11 through TRx1 may be connected to an eighth node N8, and respective source terminals of the first transistors TR11 through TRx1 may be connected to respective one ends of the first switches SW11 through SWx1. Respective gate terminals of the first transistors TR11 through TRx1 may receive a first input voltage V1 corresponding to the first voltage of the first node N1 of FIG. 10A. Respective other ends of the first switches SW11 through SWx1 may be connected to a ninth node N9. One end of the current source 623 may be connected to the ninth node N9, and the other end of the current source 623 may be grounded.

Respective drain terminals of the second transistors TR12 through TRy2 may be connected to a tenth node N10, and respective source terminals of the second transistors TR12 through TRy2 may be connected to respective one ends of the second switches SW12 through SWy2. Respective other ends of the second switches SW12 through SWx1 may be connected to the ninth node N9. Respective gate terminals of the second transistors TR12 through TRy2 may receive a second input voltage V2 corresponding to the second voltage of the second node N2 of FIG. 10A.

The source terminal of the third transistor TR3 may receive a power supply voltage VDD, and the drain terminal and the gate terminal of the third transistor TR3 may be connected to the eighth node N8.

The source terminal of the fourth transistor TR4 may receive the power supply voltage VDD, the drain terminal of the fourth transistor TR4 may be connected to the tenth node N10, and the gate terminal of the fourth transistor TR4 may be connected to the eighth node N8.

The first switches SW11 through SWx1 may be switched by a plurality of first switch control signals SW_CS1, and the second switches SW12 through SWy2 may be switched by a plurality of second switch control signals SW_CS2.

According to an embodiment, the first input voltage V1 and the second input voltage V2 may be adjusted by the number of turned-on switches among the first switches SW11 through SWx1 and the second switches SW12 through SWy2. For example, the sensing circuit 731' may apply offsets for the first input voltage V1 and the second input voltage V2 by differently controlling the number of turned-on switches among the first switches SW11 through SWx1 and the number of turned-on switches among the second switch SW12 through SWy2, based on the first switch control signals SW_CS1 and the second switch control signals SW_CS2.

According to an embodiment, the sensing circuit 731' may output, through the tenth node N10, a voltage difference V_diff generated by amplifying a difference between results of applying the offsets for the first input voltage V1 and the second input voltage V2.

According to an embodiment, the first switch control signals SW_CS1 and the second switch control signals SW_CS2 may correspond to the determined offsets.

Figure 11:
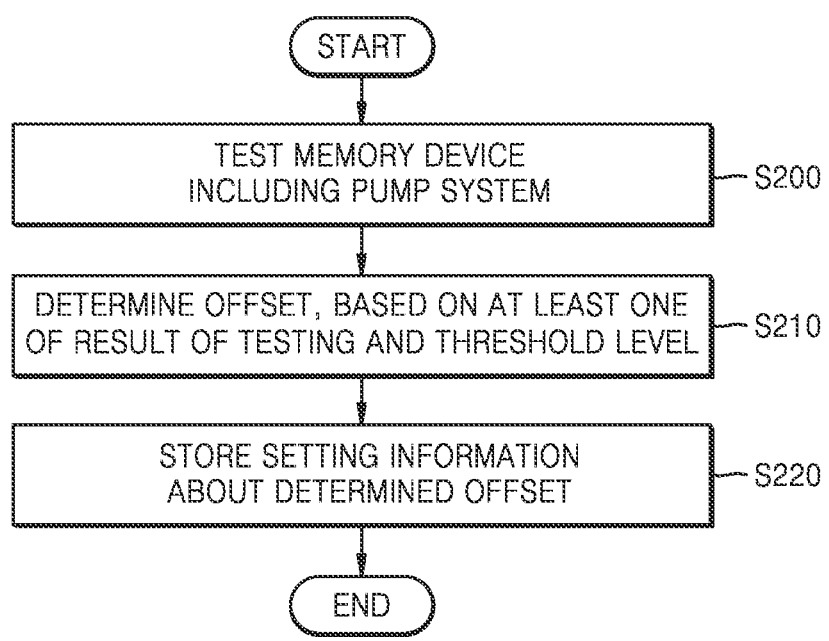
FIG. 11 is a flowchart of another example method of testing a memory device, according to an embodiment.

FIG. 11 is a flowchart of another example method of testing a memory device, according to an embodiment.

Referring to FIG. 11, in operation S200, a memory device including a pump system may be tested through a test device (e.g., a BIST circuit in the memory device). According to an embodiment, the test device may test a tendency of a current flowing through a routing resistor according to an operation of a charge pump in the pump system.

In operation S210, the test device may determine an offset based on at least one of a result of the testing in operation S200 and a threshold level of an internal current (e.g., a current flowing through a routing resistor) limited by the memory device.

In operation S220, the test device may store setting information about the offset determined in operation S210 in a memory area of the memory device. According to an embodiment, the setting information may include a value of a second parameter related to the offset. The memory device may read the value of the second parameter from the memory area before performing a memory operation, and may prepare the offset in advance based on the read value of the second parameter.

Figure 12:
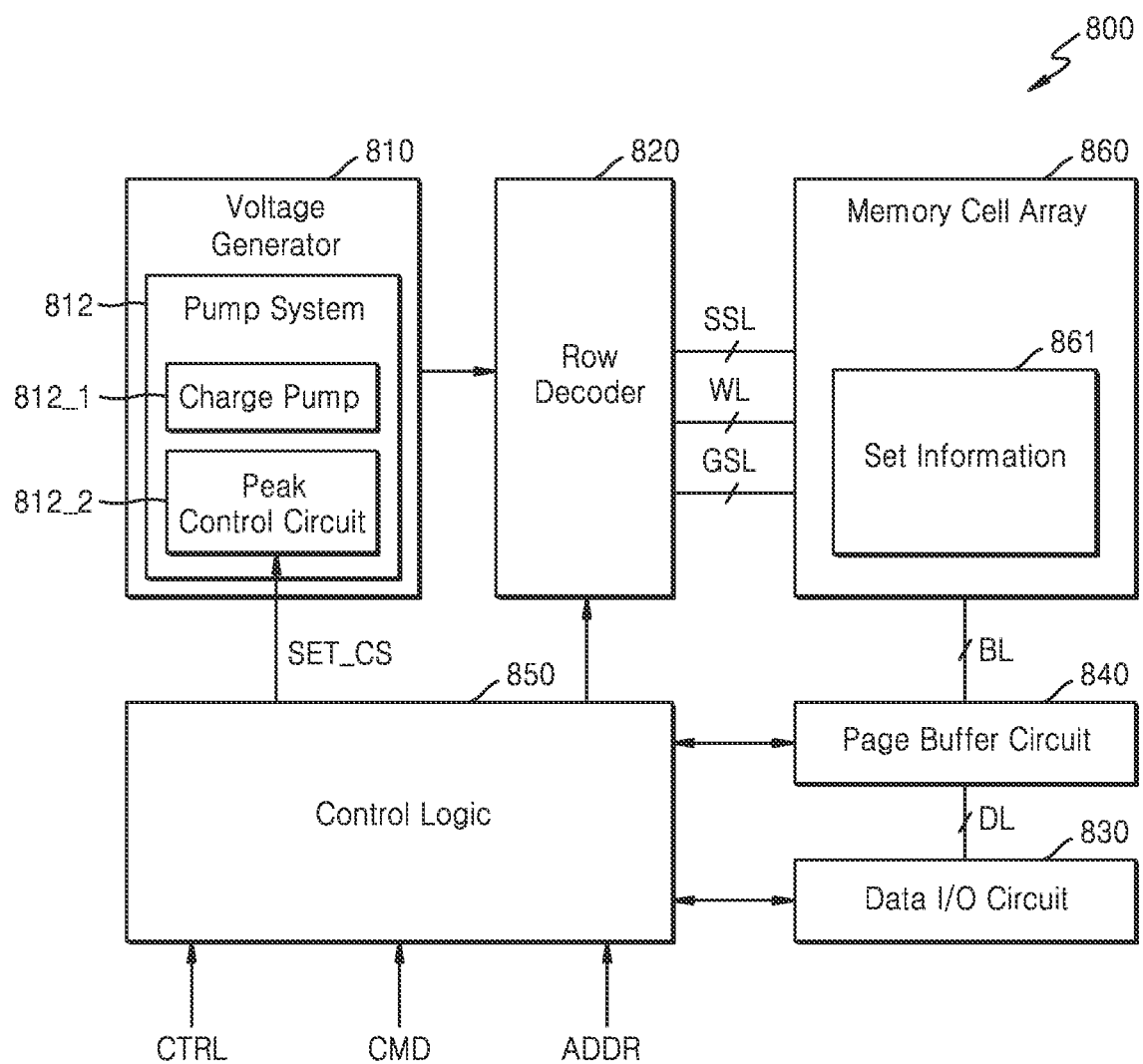
FIG. 12 is a block diagram of another example memory device according to an embodiment.

FIG. 12 is a block diagram of another example memory device 800 according to an embodiment. In FIG. 12, a peak control method of a pump system 812 by using setting information 861 will be focused on and described. The matters of FIG. 12 that are the same as those of FIG. 1 are omitted.

Referring to FIG. 12, the memory device 800 may include a voltage generator 810, a row decoder 820, a data I/O circuit 830, a page buffer circuit 840, and a memory cell array 860. The voltage generator 810 may include the pump system 812 to which the above-described embodiments have been applied, and the pump system 812 may include a charge pump 812_1 and a peak control circuit 812_2.

According to an embodiment, a memory area of the memory cell array 860 may store the setting information 861. The setting information 861, which is generated during a test of the memory device 800, may be used when the peak control circuit 812_2 operates. The setting information 861 may include at least one of a value of a first parameter related to a reference voltage and a value of a second parameter related to an offset.

According to an embodiment, a control logic 850 may read the setting information 861 from the memory cell array 860, generate a setting control signal SET_CS based on the read setting information 861, and provide the generated setting control signal SET_CS to th peak control circuit 812_2.

According to an embodiment, the peak control circuit 812_2 may prepare in advance at least one of a reference voltage and an offset for peak control based on the setting control signal SET_CS, before the charge pump 812_1 operates in earnest.

Figure 13:
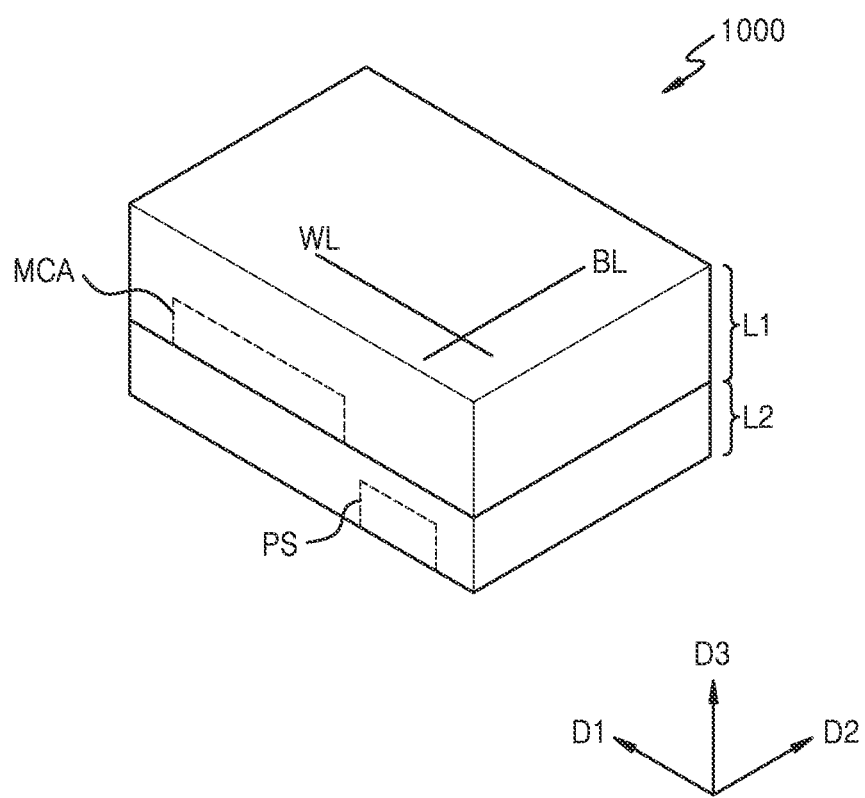
FIG. 13 is a perspective view of another example memory device according to an embodiment.

FIG. 13 is a perspective view of another example memory device 1000 according to an embodiment.

Herein, two directions intersecting each other while being substantially parallel to a first surface (e.g., an upper surface) of a semiconductor substrate are defined as a first direction D1 and a second direction D2, respectively, and a direction substantially perpendicular to the first surface of the semiconductor substrate is defined as a third direction D3. For example, the first direction D1 and the second direction D2 may intersect substantially perpendicularly to each other. A direction indicated by an arrow in the drawing and a direction opposite thereto will be described as the same direction.

Referring to FIG. 13, the semiconductor memory device 1000 may include a first semiconductor layer L1 and a second semiconductor layer L2. The first semiconductor layer L1 may be stacked on the second semiconductor layer L2 in the third direction D3, and the second semiconductor layer L2 may be disposed below the first semiconductor layer L1 in the third direction D3.

The first semiconductor layer L1 may include a memory cell array (MCA), and the second semiconductor layer L2 may include a peripheral circuit. Accordingly, the first semiconductor layer L1 may be referred to as a memory cell region, and the second semiconductor layer L2 may be referred to as a peripheral circuit region.

A peripheral circuit of the second semiconductor layer L2 may include a pump system (PS) to which embodiments of the concept have been applied. The peripheral circuit may further include a control logic that helps a peak control operation of the PS.

The second semiconductor layer L2 may include a lower substrate, and may form, on the lower substrate, semiconductor devices, such as transistors, and patterns for wiring the semiconductor devices, so that a peripheral circuit and various types of circuits may be formed on the second semiconductor layer L2.

After circuits are formed on the second semiconductor layer L2, a first semiconductor layer L1 including a MCA, a plurality of WLs, and a plurality of BLs may be formed. The first semiconductor layer L1 may include an upper substrate, and may form, on the upper substrate, a plurality of stacked gate conductive layers and a plurality of pillars penetrating through the plurality of gate conductive layers and each extending in a direction perpendicular to an upper surface of the upper substrate (for example, in the third direction), so that the memory cell array may be formed on the first semiconductor layer L1. For example, WLs may each extend in the first direction D1 and may be arranged in the second direction D2. BLs may each extend in the second direction D2 and may be arranged in the first direction D1.

Patterns for electrically connecting the MCA (namely, a plurality of WLs and a plurality of BLs) to circuits formed on the second semiconductor layer L2 may be formed on the first semiconductor layer L1.

The memory device 1000 according to embodiments may employ a structure in which a peripheral circuit is formed in a lower portion and the MCA is stacked on the peripheral circuit, that is, a cell over periphery (COP) structure in which the peripheral circuit and the MCA are disposed in the third direction D3.

Figure 14:
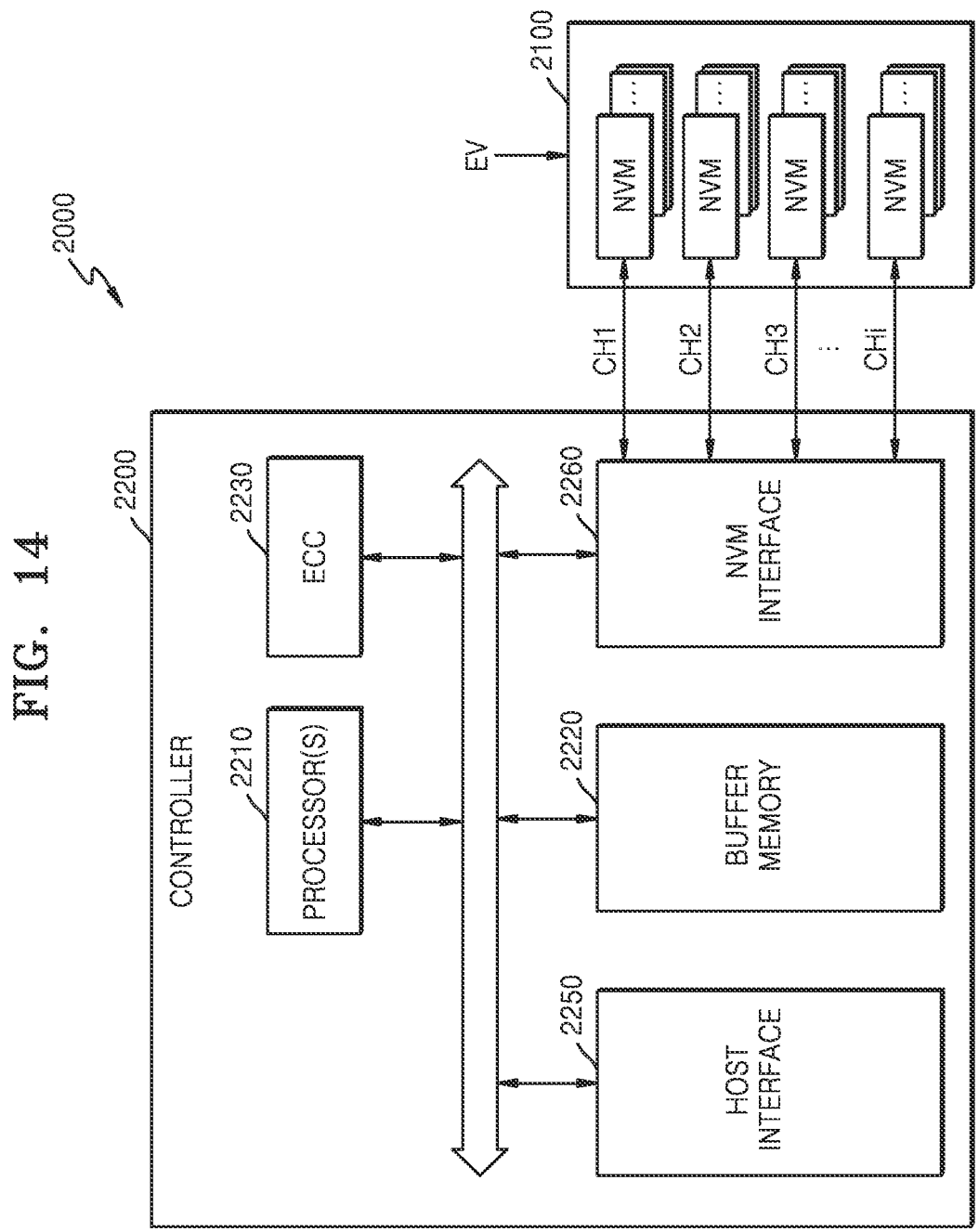
FIG. 14 is a block diagram of an example storage device including a plurality of memory devices, according to an embodiment.

FIG. 14 is a block diagram of an example storage device 2000 including a plurality of non-volatile memory devices 2100, according to an embodiment.

Referring to FIG. 14, the storage device 2000 may include the plurality of non-volatile memory devices 2100 and a controller 2200.

The controller 2200 may be connected to the nonvolatile memory devices 2100 through a plurality of channels CH1 through CHi. The controller 2200 may include at least one processor 2210, a buffer memory 2220, an error correction circuit (ECC) 2230, a host interface 2250, and a nonvolatile memory interface 2260. The buffer memory 2220 may temporarily store data necessary for driving the controller 1200. The buffer memory 2220 may buffer data that is to be used for a program operation upon a write request. The error correction circuit 2230 may calculate an error correction code value of data to be programmed in a write operation, may correct an error of data read in a read operation, based on an error correction code value, and may correct errors in data recovered from the non-volatile memory devices 2100 in a data recovery operation. The host interface 2250 and the nonvolatile memory interface 2260 may provide interface functions with external devices and the nonvolatile memory devices 2100.

The nonvolatile memory devices 2100 may be memory devices according to embodiments, and may receive an external voltage EV. The nonvolatile memory devices 2100 may generate voltages of various levels used in memory operations by using the external voltage EV and a charge pump. The nonvolatile memory devices 2100 may control a peak of a current flowing through a routing resistor according to embodiments during voltage generation through the charge pump.

Some of the nonvolatile memory devices 2100 according to an embodiment may have different characteristics (e.g., a PVT variation), and accordingly, the some memory devices may perform a peak control operation, based on the values of different parameters.

In detail, when the some memory devices include a first memory device and a second memory device, the first memory device may perform a peak control operation based on a first value of a parameter related to peak control corresponding to its own PVT variation, and the second memory device may perform a peak control operation based on a second value of a parameter related to peak control corresponding to its own PVT variation. In other words, at least one of a reference voltage and an offset both used for peak control in the first memory device may be different from at least one of a reference voltage and an offset both used for peak control in the second memory device.

The nonvolatile memory devices 2100 according to an embodiment may perform peak control operations respectively suitable for their characteristics, and as a result, overall performance of the storage device 2000 may be improved.

While the concepts disclosed herein have been particularly shown and described with reference to embodiments thereof, it will be understood that various changes in form and details may be made therein without departing from the spirit and scope of the following claims.

What is claimed is:

1. A memory device, comprising:
a memory cell array comprising a plurality of memory cells;
a control logic configured to control a memory operation of the plurality of memory cells; and
a voltage generator configured to output a voltage for the memory operation, wherein the voltage generator comprises:
a charge pump configured to generate the voltage; and
a peak control circuit configured to sense a current flowing from a pad, to which an external voltage is applied, to the charge pump and control a peak of the current to be a threshold level or less based on a result of the sensing.

2. The memory device of claim 1, wherein the peak control circuit comprises:
a sensing circuit configured to sense a voltage difference between a first voltage of the pad and a second voltage of an input node of the charge pump, the voltage difference corresponding to the current; and
a comparison circuit configured to compare the voltage difference with a reference voltage that meets the threshold level and generate a first control signal for controlling the peak of the current based on a result of the comparison.

3. The memory device of claim 2, wherein
the voltage generator further comprises a pump control circuit configured to generate a second control signal for causing a level of the voltage to reach a target level, and
the peak control circuit further comprises a control signal output circuit configured to provide a third control signal generated based on the first control signal and the second control signal to the charge pump.

4. The memory device of claim 3, wherein the control signal output circuit is configured to selectively provide the second control signal as the third control signal to the charge pump based on the level of the first control signal.

5. The memory device of claim 3, wherein the control signal output circuit is implemented as an AND gate.

6. The memory device of claim 3, wherein
the charge pump comprises a plurality of stages connected to each other in a cascade, and
a number of stages activated by the third control signal among the plurality of stages is a number of stages activated by the second control signal among the plurality of stages being adjusted by the first control signal.

7. The memory device of claim 2, wherein
the voltage generator further comprises a pump control circuit configured to generate a second control signal for causing a level of the voltage to reach a target level, in synchronization with a clock signal, and
the first control signal is a signal for adjusting at least one of a period and a magnitude of the clock signal.

8. The memory device of claim 2, wherein a level of the reference voltage is determined based on at least one of a process, voltage, temperature (PVT) variation of the memory device and the threshold level.

9. The memory device of claim 2, wherein the voltage generator further comprises a reference voltage generation circuit having a resistance circuit for adjusting a level of the reference voltage.

10. The memory device of claim 2, wherein the sensing circuit comprises low-pass filters configured to remove high-frequency band noise from the first voltage and the second voltage.

11. The memory device of claim 2, wherein the sensing circuit further comprises an offset circuit configured to apply an offset to one of the first voltage and the second voltage.

12. The memory device of claim 11, wherein the offset is determined based on at least one of a process, voltage, temperature (PVT) variation of the memory device and the threshold level.

13. The memory device of claim 1, wherein
the voltage generator further comprises a pump control circuit configured to generate a control signal for causing a level of the voltage to reach a target level, and
the peak control circuit is configured to adjust the control signal, based on the result of the sensing and provide the adjusted control signal to the charge pump.

14. The memory device of claim 13, wherein the peak control circuit is configured to adjust the control signal in a direction for reducing an increase range of the level of the voltage due to the control signal or delaying an increase in the level of the voltage due to the control signal, when the level of the current reaches the threshold level.

15. The memory device of claim 1, wherein
the voltage generator further comprises a pump control circuit configured to generate a control signal for causing a level of the voltage to reach a target level, in synchronization with a clock signal, and provide the generated control signal to the charge pump, and
the peak control circuit is configured to adjust at least one of a period and a magnitude of the clock signal, based on the result of the sensing.

16. The memory device of claim 15, wherein the peak control circuit is configured to adjust at least one of the period and the magnitude of the clock signal in a direction for reducing an increase range of the level of the voltage due to the control signal or delaying an increase in the level of the voltage due to the control signal, when the level of the current reaches the threshold level.

17. The memory device of claim 1, wherein a value of at least one parameter related to the peak control of the peak control circuit is determined based on at least one of a process, voltage, temperature (PVT) variation of the memory device and the threshold level.

18. The memory device of claim 17, wherein a memory region of the memory cell array is configured to store the value of the at least one parameter.

19. An operation method of a memory device, the operation method comprising:
- sensing a current flowing from a pad, to which an external voltage is applied, to a charge pump and a voltage drop due to a path resistance;
- comparing the sensed voltage drop with a reference voltage;
- based on a result of the comparison, generating a second control signal from a first control signal for causing a level of a voltage generated by the charge pump to reach a target level; and
- providing the second control signal to the charge pump to control a peak of the current to be a threshold level or less.

20. An operation method of a memory device, the operation method comprising:
- sensing a current flowing from a pad, to which an external voltage is applied, to a charge pump and a voltage drop due to a path resistance;
- comparing the sensed voltage drop with a reference voltage;
- adjusting at least one of a frequency and a magnitude of a clock signal so that a peak of the current is less than or equal to a threshold level based on a result of the comparison;
- generating a control signal for causing a level of a voltage generated by the charge pump, to reach a target level, in synchronization with an adjusted clock signal; and
- providing the control signal to the charge pump.

* * * * *